United States Patent
Kitagawa et al.

(10) Patent No.: US 10,639,723 B2
(45) Date of Patent: May 5, 2020

(54) MULTICOMPONENT SOLID SOLUTION MICROPARTICLES AND METHOD FOR PRODUCING SAME, AND CATALYST

(71) Applicant: KYOTO UNIVERSITY, Kyoto (JP)

(72) Inventors: Hiroshi Kitagawa, Kyoto (JP); Kohei Kusada, Kyoto (JP); Dongshuang Wu, Kyoto (JP)

(73) Assignee: Kyoto University, Kyoto (JP)

( * ) Notice: Subject to any disclaimer, the term of this patent is extended or adjusted under 35 U.S.C. 154(b) by 46 days.

(21) Appl. No.: 16/081,916

(22) PCT Filed: Mar. 1, 2017

(86) PCT No.: PCT/JP2017/008058
§ 371 (c)(1),
(2) Date: Sep. 2, 2018

(87) PCT Pub. No.: WO2017/150596
PCT Pub. Date: Sep. 8, 2017

(65) Prior Publication Data
US 2020/0001370 A1 Jan. 2, 2020

(30) Foreign Application Priority Data

Mar. 3, 2016 (JP) ................. 2016-040763

(51) Int. Cl.
| | | |
|---|---|---|
| *B22F 9/24* | (2006.01) | |
| *B01J 23/46* | (2006.01) | |
| *B01J 37/04* | (2006.01) | |
| *F01N 3/10* | (2006.01) | |

(52) U.S. Cl.
CPC ............ *B22F 9/24* (2013.01); *B01J 23/462* (2013.01); *B01J 37/04* (2013.01); *F01N 3/10* (2013.01)

(58) Field of Classification Search
CPC .......... B01D 2255/10; B01D 2255/102; B01D 2255/1021; B01D 2255/1023; B01D 2255/1025; B01D 2255/1026; B01D 2255/20761; B01J 23/38; B01J 23/40; B01J 23/42; B01J 23/44; B01J 23/46; B01J 23/72; B01J 37/00; B01J 37/08
See application file for complete search history.

(56) References Cited

U.S. PATENT DOCUMENTS

| | | |
|---|---|---|
| 5,023,226 A | 6/1991 | Immel et al. |
| 9,273,378 B2 | 3/2016 | Kitagawa et al. |
| 9,452,417 B2 | 9/2016 | Kitagawa et al. |
| 9,540,712 B2 | 1/2017 | Kitagawa et al. |
| 2010/0316931 A1 | 12/2010 | Wieland |
| 2011/0044874 A1* | 2/2011 | Dang ............... B01D 53/864 423/240 S |
| 2012/0094140 A1 | 4/2012 | Kitagawa et al. |
| 2015/0231605 A1 | 8/2015 | Kitagawa et al. |
| 2015/0231697 A1 | 8/2015 | Kitagawa et al. |

FOREIGN PATENT DOCUMENTS

| | | | | |
|---|---|---|---|---|
| EP | 2898945 A4 * | 10/2016 | ............ | B01J 23/462 |
| JP | H02-004448 A | 1/1990 | | |
| JP | 2007-100117 A | 4/2007 | | |
| KR | 101733900 B1 * | 5/2017 | ............ | B01D 53/945 |
| WO | WO 2009 118188 A1 * | 10/2009 | ............ | B01J 23/002 |
| WO | WO 2010/122811 A1 | 10/2010 | | |
| WO | WO 2014/045570 A1 | 3/2014 | | |

OTHER PUBLICATIONS

Wang et al., "Fabrication of novel Pd—Ag—Ru/Al$_2$O$_3$ ternary alloy composite membrane with remarkably enhanced H$_2$ permeability," *J. Membrane Sci.*, 306(1-2): 1-7 (2007).

Zhao et al., "Facile preparation and excellent catalytic performance of PtRuPd hollow spheres nanoelectrocatalysts," *Materials Chemistry and Physics*, 115(2-3): 831-834 (2009).

European Patent Office, Extended European Search Report in European Patent Application No. 17760060.8 (dated Sep. 11, 2019).

Japanese Patent Office, International Search Report in International Patent Application No. PCT/JP2017/008055 (dated May 30, 2017).

* cited by examiner

*Primary Examiner* — Timothy C Vanoy
(74) *Attorney, Agent, or Firm* — Leydig, Voit & Mayer, Ltd.

(57) ABSTRACT

This invention provides a multinary solid solution fine particle represented by $Pd_xRu_yM_z$ (M is at least one member selected from the group consisting of Rh, Pt, Cu, Ag, Au and Ir. $x+y+z=1$, $x+y=0.01$ to $0.99$, $z=0.99$ to $0.01$, $x:y=0.1:0.9$ to $0.9:0.1$), a method for producing the same, and a supported catalyst.

15 Claims, 27 Drawing Sheets
(23 of 27 Drawing Sheet(s) Filed in Color)

Fig. 16
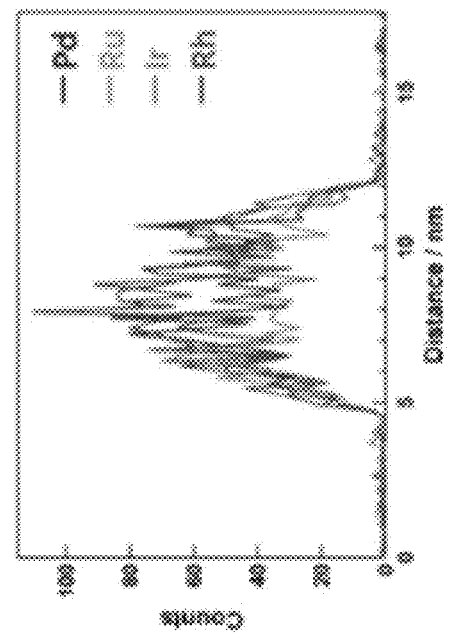
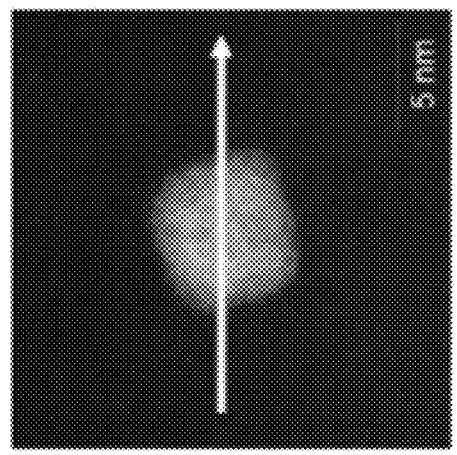
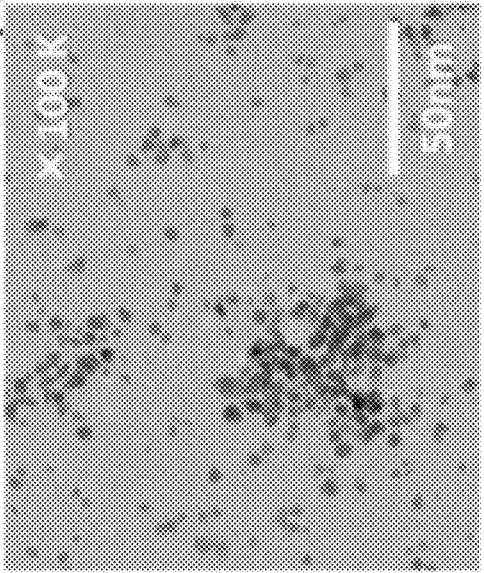

MULTICOMPONENT SOLID SOLUTION MICROPARTICLES AND METHOD FOR PRODUCING SAME, AND CATALYST

CROSS-REFERENCE TO RELATED APPLICATIONS

This patent application is the U.S. national phase of International Patent Application No. PCT/JP2017/008058, filed Mar. 1, 2017, which claims the benefit of Japanese Patent Application No. 2016-040763, filed on Mar. 3, 2016, which are incorporated by reference in their entireties herein.

TECHNICAL FIELD

The present invention relates to a multinary solid solution fine particle and a method for producing the multinary solid solution fine particle, and a catalyst.

BACKGROUND ART

Palladium (Pd) is one of the rare metals, and its fine particles are industrially used in various oxidation, reduction, dehydration reaction catalysts, such as catalysts for purification of exhaust gas from automobiles, motorcycles, stationary motors, and factories (three-way catalysts), electrode catalysts for domestic fuel cells in ENE-FARM systems, and VOC removing catalysts. However, fine particles of palladium used in these catalysts are poisoned by CO (carbon monoxide) generated during various chemical reactions, which makes it difficult to use the particles at high power for a long period of time. Thus, there have been many studies on techniques to reduce the degradation of catalysts due to such poisoning. Ruthenium, one of the platinum group metals, is durable against CO poisoning because of its catalytic activity to oxidize CO to $CO_2$ (carbon dioxide). Thus ruthenium has been used in the form of an alloy with other metals, such as platinum, in electrodes of fuel cells in order to reduce CO poisoning. However, palladium and ruthenium are mutually immiscible in equilibrium at the atomic level (i.e., they cannot form a solid solution), and they are separated from each other. A combination of two metals, Rh and Ag or Rh and Au, is also immiscible at the atomic level.

Patent Literature 1 discloses the use of Pd—Ru solid-solution-alloy fine particles as a catalyst, and Patent Literature 2 discloses alloy fine particles in which silver and rhodium or gold and rhodium are present in the form of a solid solution. However, these solid solutions of two metals are thermally unstable, causing concern over durability at high temperatures.

CITATION LIST

Patent Literature

PTL 1: WO2014/045570
PTL 2: WO2010/122811

SUMMARY OF INVENTION

Technical Problem

An object of the present invention is to provide a novel alloy fine particle and a catalyst excellent in heat resistance.

Solution to Problem

In the present invention, it was found that a multinary solid solution fine particle containing Pd and Ru, and further containing at least one member selected from the group consisting of Rh, Pt, Cu, Ag, Au and Ir maintains the catalytic properties even after use at high temperature for a long period of time.

The present invention provides a multinary solid solution fine particle and a method for producing the multinary solid solution fine particle, and a catalyst as described below.

Item 1. A multinary solid solution fine particle represented by $Pd_xRu_yM_z$ (M is at least one member selected from the group consisting of Rh, Pt, Cu, Ag, Au and Ir. $x+y+z=1$, $x+y=0.01$ to $0.99$, $z=0.99$ to $0.01$, $x:y=0.1:0.9$ to $0.9:0.1$).

Item 2. The multinary solid solution fine particle according to Item 1, wherein M is one or two members selected from the group consisting of Rh, Pt, Cu, Ag, Au and Ir.

Item 3. The multinary solid solution fine particle according to Item 1, wherein M is represented by $M^1_p M^2_q$ ($M^1$ and $M^2$ are different from each other and each selected from the group consisting of Rh, Pt, Cu, Ag, Au and Ir. $p=0.01$ to $0.99$, $q=0.99$ to $0.01$, $p+q=1$).

Item 4. The multinary solid solution fine particle according to Item 3, wherein $M^1$ and $M^2$ are any one of a combination of Ir and Rh, a combination of Ir and Pt, or a combination of Rh and Pt.

Item 5. The multinary solid solution fine particle according to Item 1, wherein M is Rh.

Item 6. The multinary solid solution fine particle according to Item 1, wherein $x+y=0.05$ to $0.95$, $z=0.95$ to $0.05$, and $x:y=0.15:0.85$ to $0.85:0.15$.

Item 7. The multinary solid solution fine particle according to Item 1, wherein $x+y=0.1$ to $0.9$, $z=0.9$ to $0.1$, and $x:y=0.2:0.8$ to $0.8:0.2$.

Item 8. A catalyst comprising the multinary solid solution fine particle according to any one of Items 1 to 7.

Item 9. A supported catalyst comprising the catalyst according to Item 8, and a carrier, the catalyst being supported on the carrier.

Item 10. The supported catalyst according to Item 9, wherein the carrier is a carrier including an oxide.

Item 11. The supported catalyst according to Item 9, the supported catalyst being a catalyst for purification of exhaust gas.

Item 12. A method for producing the multinary solid solution fine particle according to any one of Items 1 to 7, the method comprising adding an aqueous solution containing: at least one member selected from the group consisting of an Rh compound, a Pt compound, a Cu compound, an Ag compound, an Au compound and an Ir compound; a Pd compound; and a Ru compound to a liquid reducing agent heated to 150° C. to 250° C. to cause reaction thereamong.

Item 13. A method for producing the supported catalyst according to Item 9 or Item 10, the method comprising adding an aqueous solution containing: at least one member selected from the group consisting of an Rh compound, a Pt compound, a Cu compound, an Ag compound, an Au compound and an Ir compound; a Pd compound; and a Ru compound, and a carrier to a liquid reducing agent heated to 150° C. to 250° C. to cause reaction thereamong.

Item 14. The method according to Item 13, wherein the carrier is a carrier including an oxide.

Advantageous Effects of Invention

By adding an additional element to a PdRu solid solution alloy that is not obtained in bulk, it is possible to stabilize the solid solution state of Pd and Ru and to prevent the catalyst from degrading in reactions at high temperature or in reactions for a long period of time.

Further, by providing a multinary alloy fine particle containing an additional element, the alloy is expected to have unprecedented characteristics because of its electron state that is different from the electron state of a binary alloy.

BRIEF DESCRIPTION OF DRAWINGS

The patent or application file contains at least one drawing executed in color. Copies of this patent or patent application publication with color drawing(s) will be provided by the Office upon request and payment of the necessary fee.

FIG. 16 shows (a) an XRD pattern, (b) a TEM image (mean particle size 3.5±1.4 nm) and (c) an STEM-EDX linear analysis of a PdRuIrRh quaternary solid solution nanoparticle. The PdRuIrRh solid solution was successfully synthesized.

DESCRIPTION OF EMBODIMENTS

Figure 1:
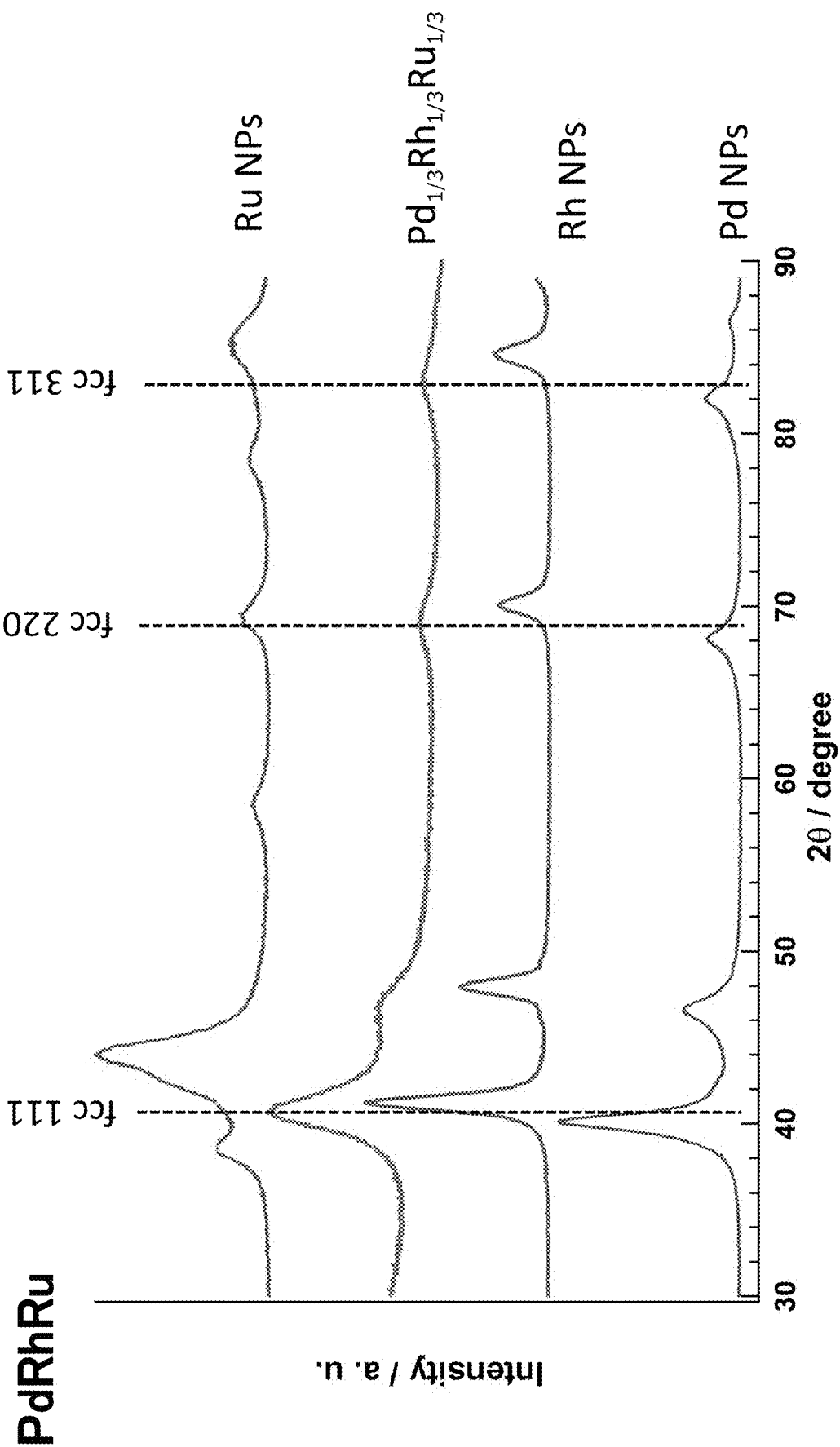
FIG. 1 shows an XRD pattern of a ternary solid solution nanoparticle of the present invention (loading ratio at the time of synthesis Pd:Rh:Ru=1:1:1). In the XRD of the ternary $Pd_{1/3}Ru_{1/3}Rh_{1/3}$, a single fcc pattern is observed, and the fcc pattern peaks at a position different from those of nanoparticles of Pd, Rh, and Ru alone, revealing that a solid solution is formed.

A multinary solid solution fine particle of the present invention is a multinary solid solution fine particle containing Pd and Ru which are two non-solid-solution metals, and further containing at least one member selected from the group consisting of Rh, Pt, Cu, Ag, Au and Ir as an additional metal (M), represented by:

$$Pd_xRu_yM_z$$

(M is at least one member selected from the group consisting of Rh, Pt, Cu, Ag, Au and Ir. x+y+z=1, x+y=0.01 to 0.99, z=0.99 to 0.01, x:y=0.1:0.9 to 0.9:0.1). A total molar ratio (x+y) of Pd and Ru is preferably 1 to 99%, more preferably 5 to 95%, and further preferably 10 to 90% of the multinary solid solution fine particle; and a molar ratio (z) of the additional metal (M) is preferably 99 to 1%, more preferably 95 to 5%, further preferably 90 to 104 of the multinary solid solution fine particle.

M may be one, two, three, four, five or six metal(s), preferably one, two, three, four or five metal(s), more preferably one, two, three, or four metal(s), further preferably one, two or three metal(s), and particularly preferably one or two metal(s). When M is one metal, the solid solution fine particle is a ternary solid solution fine particle, when M is a combination of two metals, the solid solution fine particle is a quaternary solid solution fine particle, when M is a combination of three metals, the solid solution fine particle is a pentanary solid solution fine particle, when M is a combination of four metals, the solid solution fine particle is a hexanary solid solution fine particle, when M is a combination of five metals, the solid solution fine particle is a heptanary solid solution fine particle, and when M is a combination of six metals, the solid solution fine particle is a octanary solid solution fine particle.

When M is formed of two metals, a combination of Ir and Rh, a combination of Ir and Pt, or a combination of Rh and Pt is preferred.

When M is formed of two metals, M=M$^1_{p2}$M$^2_{q2}$ (M$^1$ and M$^2$ are different from each other and each selected from the group consisting of Rh, Pt, Cu, Ag, Au and Ir, p2=0.01 to 0.99, q2=0.99 to 0.01, and p2+q2=1.).

When M is formed of three metals, M=M$^1_{p3}$M$^2_{q3}$M$^3_{r3}$ (M$^1$, M$^2$ and M$^3$ are different from one another and each selected from the group consisting of Rh, Pt, Cu, Ag, Au and Ir, p3=0.01 to 0.98, q3=0.01 to 0.98, r3=0.01 to 0.98, and p3+q3+r3=1.).

When M is formed of four metals, M=M$^1_{p4}$M$^2_{q4}$M$^3_{r4}$M$^4_{s4}$ (M$^1$, M$^2$, M$^3$ and M$^4$ are different from one another and each selected from the group consisting of Rh, Pt, Cu, Ag, Au and Ir, p4=0.01 to 0.97, q4=0.01 to 0.97, r4=0.01 to 0.97, s4=0.01 to 0.97, and p4+q4+r4+s4=1.).

When M is formed of five metals, M=M$^1_{p5}$M$^2_{q5}$M$^3_{r5}$M$^4_{s5}$M$^5_{t5}$ (M$^1$, M$^2$, M$^3$, M$^4$ and M$^5$ are different from one another and each selected from the group consisting of Rh, Pt, Cu, Ag, Au and Ir, p5=0.01 to 0.96, q5=0.01 to 0.96, r5=0.01 to 0.96, s5=0.01 to 0.96, t5=0.01 to 0.96, and p5+q5+r5+s5+t5=1.).

When M is formed of six metals, M=M$^1_{p6}$M$^2_{q6}$M$^3_{r6}$M$^4_{s6}$M$^5_{t6}$M$^6_{u6}$ (M$^1$, M$^2$, M$^3$, M$^4$, M$^5$ and M$^6$ are different from one another and each selected from the group consisting of Rh, Pt, Cu, Ag, Au and Ir, p6=0.01 to 0.95, q6=0.01 to 0.95, r6=0.01 to 0.95, s6=0.01 to 0.95, t6=0.01 to 0.95, u6=0.01 to 0.95, and p6+q6+r6+s6+t6+u6=1.). A molar ratio (x:y) of Pd and Ru in the multinary solid solution fine particle is 0.1:0.9 to 0.9:0.1, preferably 0.15:0.85 to 0.85:0.15, more preferably 0.2:0.8 to 0.8:0.2, further preferably 0.25:0.75 to 0.75:0.25, and particularly preferably 0.3:0.7 to 0.7:0.3.

The multinary solid solution fine particle of the present invention can be used as a catalyst that exhibits excellent properties. Although there is no particular limitation for the form of the multinary solid solution fine particle in using the multinary solid solution fine particle as a catalyst, it is preferred to use as a supported catalyst that is supported on a carrier. Specific examples of the carrier to be used include, but are not particularly limited to, oxides, nitrides, carbides, elemental carbons, and elemental metals; and among these, oxides or elemental carbons are preferred, and oxides are particularly preferred as a carrier. Examples of the oxides include silica, alumina, ceria, titania, zirconia, and niobia, and composite oxides such as silica-alumina, titania-zirconia, ceria-zirconia, and strontium titanate. Examples of the elemental carbons include activated carbon, carbon black, graphite, carbon nanotube, and activated carbon fiber. Examples of the nitrides include boron nitride, silicon nitride, gallium nitride, indium nitride, aluminum nitride, zirconium nitride, vanadium nitride, tungsten nitride, molybdenum nitride, titanium nitride, and niobium nitride. Examples of the carbides include silicon carbide, gallium carbide, indium carbide, aluminum carbide, zirconium carbide, vanadium carbide, tungsten carbide, molybdenum carbide, titanium carbide, niobium carbide, and boron carbide. Examples of the elemental metals include pure metals such as iron, copper, and aluminum, and alloys such as stainless steel.

While the catalytic reaction in which the multinary solid solution fine particle of the present invention shows excellent properties is not particularly limited, for example, reactions that are generally known for using a catalyst containing an element of Groups 8 to 11 in the periodic table are recited, and specifically, chemical reactions such as reduction reactions including hydrogenation reaction, oxidation reactions including dehydrogenation reaction and combustion, and coupling reaction can be recited. By utilizing these catalytic properties, it is possible to use the multinary solid solution fine particle of the present invention to applications of various processes and apparatuses. Examples of the application for which the multinary solid solution fine particle of the present invention can be favorably utilized include, but are not particularly limited to, environmental exhaust gas purification applications utilizing the catalytic properties in nitrogen oxide (NO$_x$) reduction reaction, carbon monoxide (CO) oxidation reaction, hydrocarbon oxidation reaction, VOC oxidation reaction and the like, electrode applications utilizing the catalytic properties in hydrogen oxidation reaction, oxygen reduction reaction, water electrolysis and the like, and chemical process applications utilizing the catalytic properties in hydrogenation reaction of unsaturated hydrocarbons and dehydrogenation reaction of saturated or unsaturated hydrocarbons. Among these, the multinary solid solution fine particle of the present invention can be more favorably used particularly for applications of exhaust gas purification of automobiles, motorcycles, stationary motors and the like, hydrogen fuel cells, and VOC removal.

As described above, in utilizing the multinary solid solution fine particle of the present invention as a catalyst, an optimum composition ratio of Pd, Ru and the additional metal (M) differs depending on the target catalytic reaction. For example, the multinary solid solution fine particle having Pd:Ru=0.5:0.5 is especially excellent as a three-way catalyst for purification of exhaust gas. The three-way catalyst as used here indicates a catalyst having catalytic activity in the following three reactions: to reduce nitrogen oxides ($NO_x$) into nitrogen, to oxidize carbon monoxide (CO) to form carbon dioxide, and to oxidize hydrocarbons to form water and carbon dioxide.

The additional metal (M) is a metal that forms a solid solution with a binary alloy of Pd or Ru as a stable phase at 1000° C. or less, preferably at 600° C. or less, more preferably at 400° C. or less, and further preferably at room temperature, and is at least one member selected from the group consisting of Rh, Pt, Cu, Ag, Au and Ir, preferably at least one member selected from the group consisting of Rh, Cu, Pt and Ir, more preferably at least one member selected from the group consisting of Rh, Pt and Ir, and particularly preferably Rh. For example, in a solid solution consisting exclusively of Pd and Ru, there is a tendency that Pd and Ru gradually separate from each other by heating at high temperature for a long time, and Ru volatilizes. In contrast, the multinary solid solution fine particle of the present invention is stable in a durability test in the exhaust gas purification reaction and keeps its structure. The durability is improved by the additional metal (M).

The multinary solid solution fine particle of the present invention has a mean particle size of about 1 nm to 120 nm, preferably about 1 nm to 80 nm, more preferably about 1 to 60 nm, and further preferably about 1 to 30 nm. A smaller mean particle size is preferred because the catalytic activity increases.

Regarding the multinary solid solution fine particle of the present invention, it is possible to obtain a multinary solid solution fine particle containing three or more metals (Pd, Ru and M) in a solid solution state by preparing a mixed aqueous solution containing water-soluble compounds (salts) of three or more metals, and a liquid reducing agent, adding the mixed aqueous solution containing water-soluble compounds of three or more metals (Pd and Ru, additionally M (at least one member selected from the group consisting of Rh, Cu, Ag, Au, Pt and Ir)) to the liquid reducing agent (polyhydric alcohol such as ethylene glycol, glycerin, diethylene glycol, or triethylene glycol) and heating the resultant solution for about 1 minute to 12 hours under stirring to allow them to react, and allowing the solution to cool, followed by centrifugal separation. The liquid reducing agent is used in an amount of 1 equivalent or more, preferably in an excessive amount so as to reduce the water-soluble compounds of three or more metals. The reaction temperature under heating is about 100 to 300° C., for example, about 150 to 250° C. Either or both of the liquid reducing agent and the mixed aqueous solution containing water-soluble compounds of three metals (Pd, Ru and M) may be preliminarily heated, and then mixed.

By adding a protective agent into a reaction solution for production of the multinary solid solution fine particle, it is possible to obtain fine particles in which aggregation is suppressed. Also, coexistence of a carrier in the reaction solution makes it possible to obtain a supported catalyst in which the multinary solid solution fine particle is supported on the carrier. Further, it is possible to obtain a supported catalyst in which the multinary solid solution fine particle is supported on a carrier by mixing the multinary solid solution fine particle and the carrier in a solution or by mixing powders in a non-solvent system, followed by filtration and drying when a solvent is used, and molding.

The molar ratio of the Pd compound, the Ru compound, and the third metal compound that are respectively water-soluble becomes the molar ratio of the obtained multinary solid solution fine particle.

Examples of the Pd compound, the Ru compound and the third metal compound that are water-soluble are as follows.

Pd: $K_2PdCl_4$, $Na_2PdCl_4$, $K_2PdBr_4$, $Na_2PdBr_4$, palladium nitrate, etc.

Ru: ruthenium halide such as $RuCl_3$, or $RuBr_3$, ruthenium nitrate, etc.

Rh: rhodium acetate, rhodium nitrate, rhodium chloride, etc.

Pt: $K_2PtCl_4$, $(NH_4)_2K_2PtCl_4$, $(NH_4)_2PtCl_6$, $Na_2PtCl_6$, etc.

Au: chloroauric acid, bromoauric acid, gold acetate, etc.

Ir: iridium chloride, iridium acetylacetonate, iridium potassium cyanate, potassium iridate, etc.

Ag: silver nitrate, silver acetate, etc.

Cu: copper sulfate, cuprous chloride, cupric chloride, copper acetate, copper nitrate, etc.

Examples of the protective agent include polymers such as poly(N-vinyl-2-pyrrolidone) (PVP), and polyethylene glycol (PEG), amines such as oleyl amine, and carboxylic acids such as oleic acid.

When subjecting the multinary solid solution fine particles of the present invention that are not supported on a carrier to heat treatment at a temperature of 650° C. or higher, it is preferable to heat the particles with the multinary solid solution fine particles not being in contact with one another so that the metal fine particles do not bond to one another.

The multinary solid solution fine particle of the present invention is particularly useful as a three-way catalyst. Three-way catalysts, for example, reduce $NO_x$ into nitrogen, oxidize CO to form carbon dioxide, and oxidize hydrocarbons (CH) to form water and carbon dioxide.

EXAMPLES

The following describes the present invention in more detail, with reference to the Examples. However, the present invention is not limited to these Examples.

Example 1: Production of Ternary Solid Solution Fine Particles (Pd:Ru:Rh=1:1:1)

Figure 2:
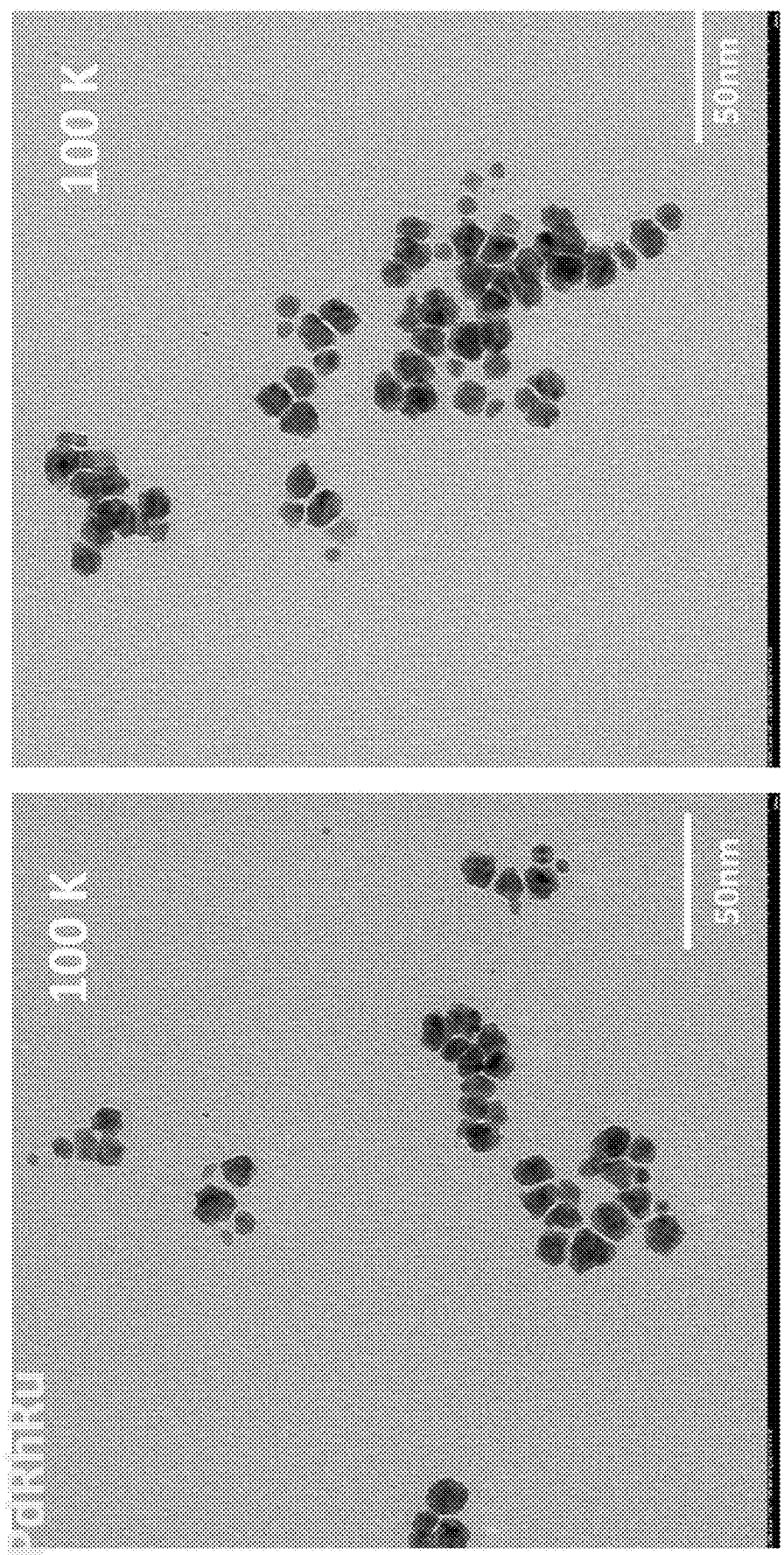
FIG. 2 shows TEM images of a ternary solid solution nanoparticle of the present invention ($Pd_{1/3}Ru_{1/3}Rh_{1/3}$). The nanoparticle has a mean particle size of 10.3±2.8 nm.
Figure 3:
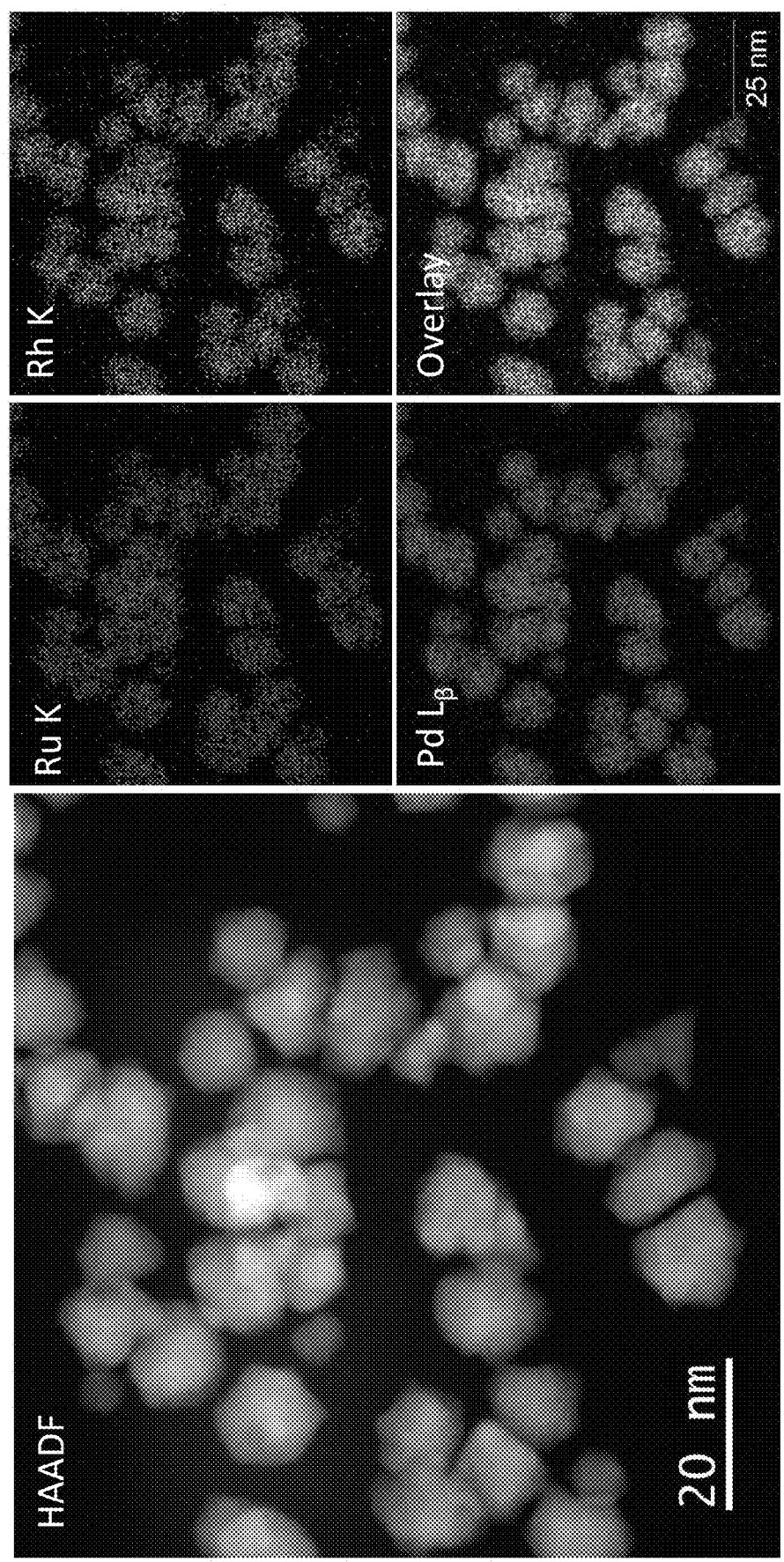
FIG. 3 shows an HAADF-STEM image and STEM-EDX images of a ternary solid solution nanoparticle of the present invention ($Pd_{1/3}Ru_{1/3}Rh_{1/3}$). It was confirmed that all of the three elements Ru, Rh, and Pd exist in each particle, and a solid solution is formed.
Figure 4:
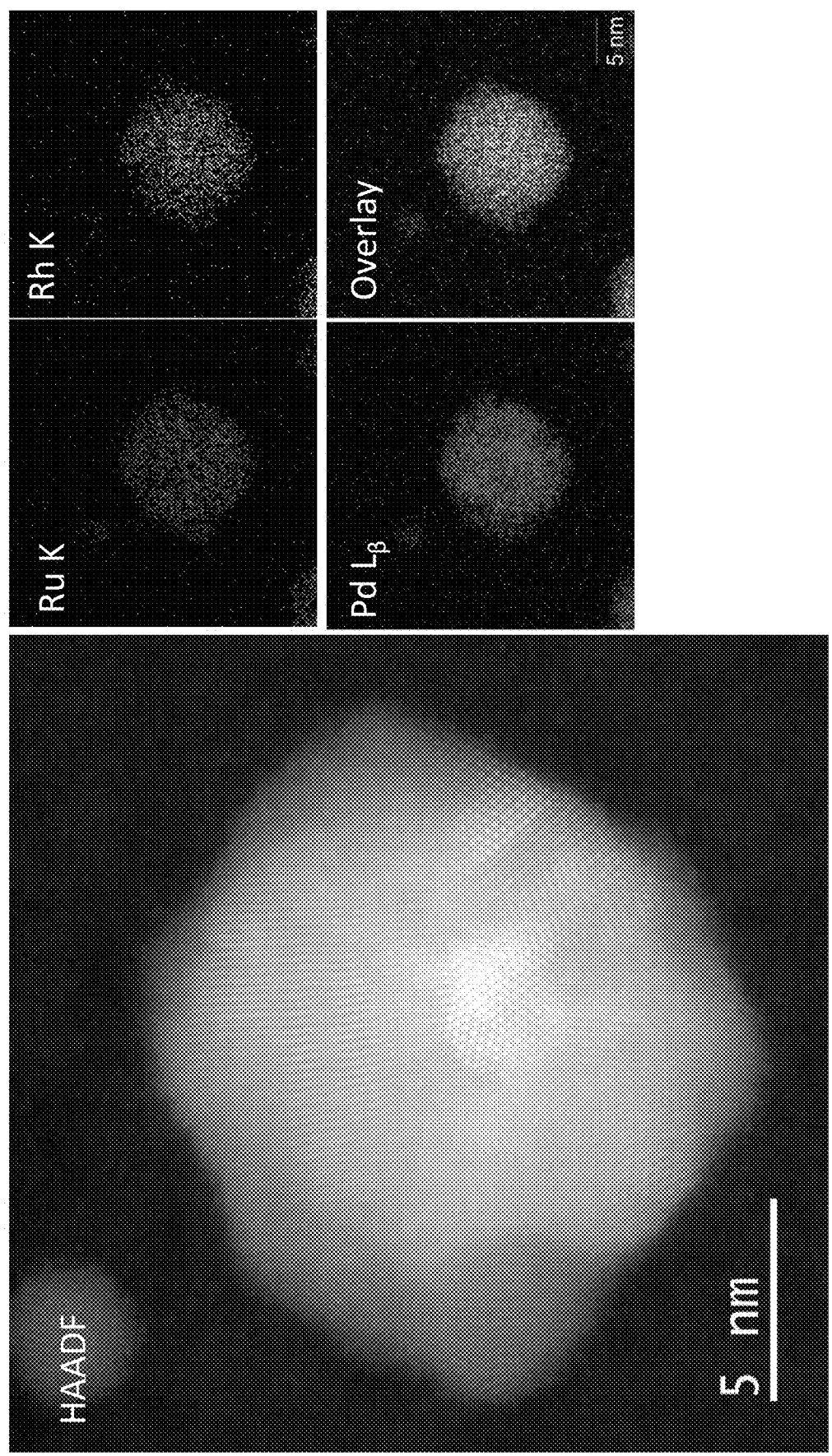
FIG. 4 shows an HAADF-STEM image and STEM-EDX images of a ternary solid solution nanoparticle of the present invention (loading ratio at the time of synthesis Pd:Rh:Ru=1:1:1) directly after synthesis.

To 300 ml of triethylene glycol heated at 200° C. under stirring, a solution of $K_2PdCl_4$ (0.33 mmol), $RuCl_3$ (0.33 mmol) and rhodium chloride (0.33 mmol) in 40 ml of ion exchange water was added, and the resultant solution was kept at 200° C. for 5 minutes, and then allowed to cool. The generated precipitates were then separated by centrifugation. For the separated $Pd_{1/3}Ru_{1/3}Rh_{1/3}$ ternary solid solution fine particles in a solid solution state, an XRD pattern (FIG. 1)

and a peak position thereof (Table 1), a TEM image (FIG. 2), an STEM-EDX image, and an HAADF-STEM image (FIG. 3, FIG. 4) were measured.

TABLE 1

| Fcc | PdRuRh | Pd | Rh | Hcp | Ru |
|-----|--------|--------|--------|-----|--------|
| 111 | 40.766 | 41.212 | 40.106 | 010 | 38.597 |
| 200 | 47.132 | 47.952 | 46.594 | 002 | 42.470 |
| 220 | 69.208 | 70.082 | 68.070 | 011 | 44.029 |
| 311 | 83.151 | 84.567 | 82.052 | 102 | 58.464 |
|     |        |        |        | 110 | 69.428 |

Example 2: Production of Ternary Solid Solution Fine Particles (Pd:Ru:Rh=1:1:1)

Figure 5:
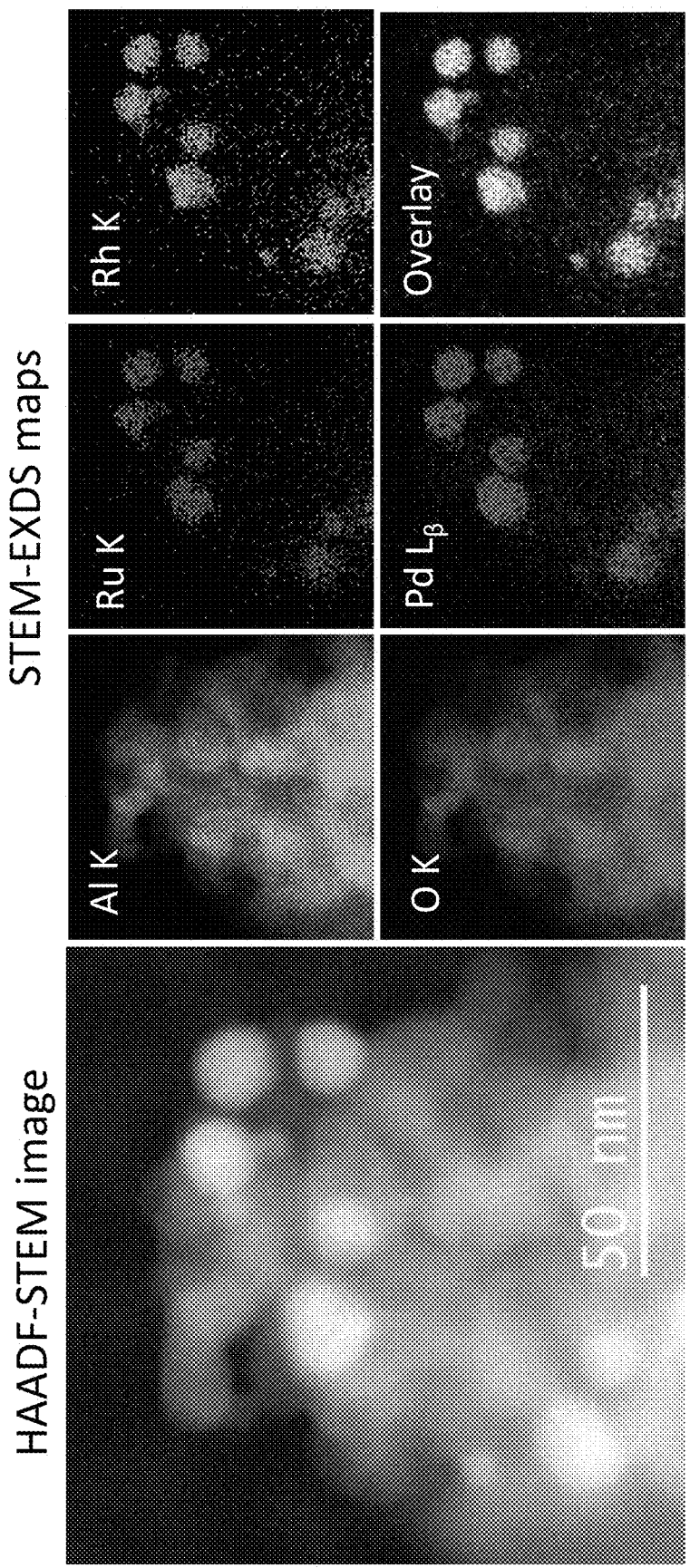
FIG. 5 shows an HAADF-STEM image and STEM-EDX images after a durability test of a catalyst supporting 1 wt % of a ternary solid solution nanoparticle of the present invention (loading ratio at the time of synthesis Pd:Rh:Ru=1:1:1) on $\gamma$-$Al_2O_3$. The solid solution structure is maintained after a general durability test in the exhaust gas purification reaction of automobile catalyst. Durability test: 1000° C.×10 h fuel rich atmosphere condition.

A predetermined amount of the alloy fine particles after drying obtained in Example 1 was weighed and put into purified water and subjected to an ultrasonic treatment to obtain a dispersion liquid of alloy fine particles. At this time, the amount of alloy fine particles to be weighed was calculated and determined on the basis of respective contents of the metals determined in advance by elementary analysis. To this dispersion liquid, powder of γ-alumina (Catalysis Society of Japan, Reference catalyst JRC-ALO8) preliminarily fired at 800° C. for 5 hours was added, and the resultant liquid was stirred for 12 hours with a magnetic stirrer. The liquid after stirring was transferred to a rotary evaporator and dried to powder by heating at 60° C. under reduced pressure. Then, the obtained powder was left to stand in a drier at 120° C. for 8 hours so as to completely remove the water from the powder. The powder after drying was sufficiently ground in a mortar, and then molded into a disc shape by a monoaxial molding machine in the condition of 1.2 MPa for 5 minutes. The obtained molded product was ground, and then sieved to give particulates having a diameter of 180 to 250 μm. In this manner, a catalyst in which 1% by mass of the PdRuRh ternary solid solution fine particles were supported on alumina powder was obtained. The obtained catalyst was subjected to a durability test at 1000° C.×10 h in a fuel rich atmosphere condition. The result is shown in FIG. 5.

Comparative Example 1

To 300 ml of triethylene glycol heated at 200° C. under stirring, a solution of $K_2PdCl_4$ (0.5 mmol) and $RuCl_3$ (0.5 mmol) in 40 ml of ion exchange water was added, and the resultant solution was kept at 200° C. for 5 minutes, and then allowed to cool. The generated precipitates were centrifuged to separate $Pd_{0.5}Ru_{0.5}$ binary solid solution fine particles in a solid solution state.

Comparative Example 2

To 200 ml of ethylene glycol heated at 196° C. under stirring, a solution of rhodium chloride (5.0 mmol) in 20 ml of ion exchange water was added, and the resultant solution was stirred under heating for 90 minutes, and then allowed to cool. The generated precipitates were centrifuged to separate Rh fine particles.

Test Example 1: Catalytic Activity as Three-Way Catalyst

The $Pd_{1/3}Ru_{1/3}Rh_{1/3}$ alloy fine particles obtained in Example 2 were used as a catalyst to simultaneously evaluate the catalytic activity in reduction reaction of nitrogen oxide ($NO_x$), catalytic activity in oxidation of carbon monoxide (CO), and catalytic activity in oxidation of hydrocarbons ($C_3H_6$). Also, for comparison, $Pd_{0.5}Ru_{0.5}$ alloy fine particles (Comparative Example 1), Rh fine particles (Comparative Example 2)-supported catalysts were prepared in the same manner.

The evaluation of catalytic activity of the particles as a three-way catalyst was performed using a fixed-bed flow reactor. First, 200 mg of a pelletized catalyst was packed into a quartz reaction tube with an inner diameter of 7 mm using quartz wool. This reaction tube was connected to the reactor, and $N_2$-based mixed gas simulating automotive exhaust gas with a theoretical air-to-fuel ratio (NO: 1000 ppm, $O_2$: 0.6%, CO: 0.6%, $C_3H_6$: 555 ppm, $CO_2$: 13.9%, $H_2$: 0.2%, $N_2$: balance gas) was supplied to the reactor by regulating the flow rate so as to achieve a space velocity of 60 liter/(h·$g_{cat}$) (total flow rate: 200 ml/min). The temperature of the catalyst bed at the time when the supply of the mixed gas was started was room temperature. While the temperature of the catalyst bed was increased from room temperature to 600° C. at a rate of 10° C./min from the start of the mixed gas supply, the concentrations of $NO_x$, CO, and $C_3H_6$ contained in the collected gas were continually measured every 30 seconds with a multi-gas analyzer (Horiba, Ltd., VA-3000). The durability evaluation was performed by repeating measurement up to 600° C., followed by measurement up to 600° C. in the same manner after allowing the catalyst bed to cool to room temperature.

Figure 6:
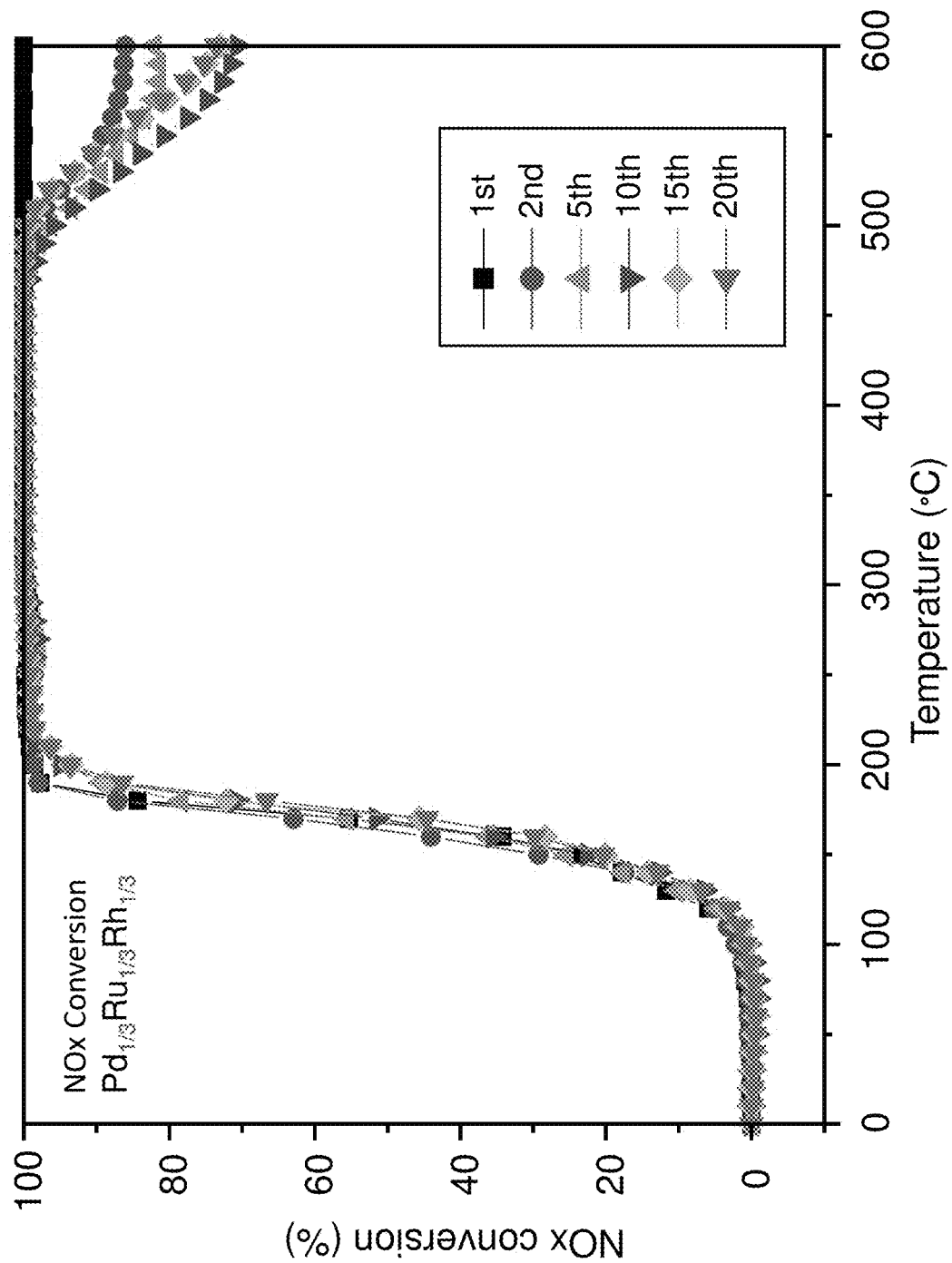
FIG. 6 shows evaluation of repetition durability of $Pd_{1/3}Ru_{1/3}Rh_{1/3}$ in reduction reaction of nitrogen oxide. Deterioration in activity is little even when observed after repetition of the reaction.

FIGS. 6 to 9 show the measurement results. FIG. 6 is a graph showing $NO_x$ reduction catalytic activity of a noble metal-supported catalyst prepared with $Pd_{1/3}Ru_{1/3}Rh_{1/3}$ fine particles. The vertical axis indicates a percentage of converted nitrogen oxide. Similar behaviors were observed in measurements from the first time to the twentieth time, revealing that the catalytic activity did not deteriorate.

Figure 7:
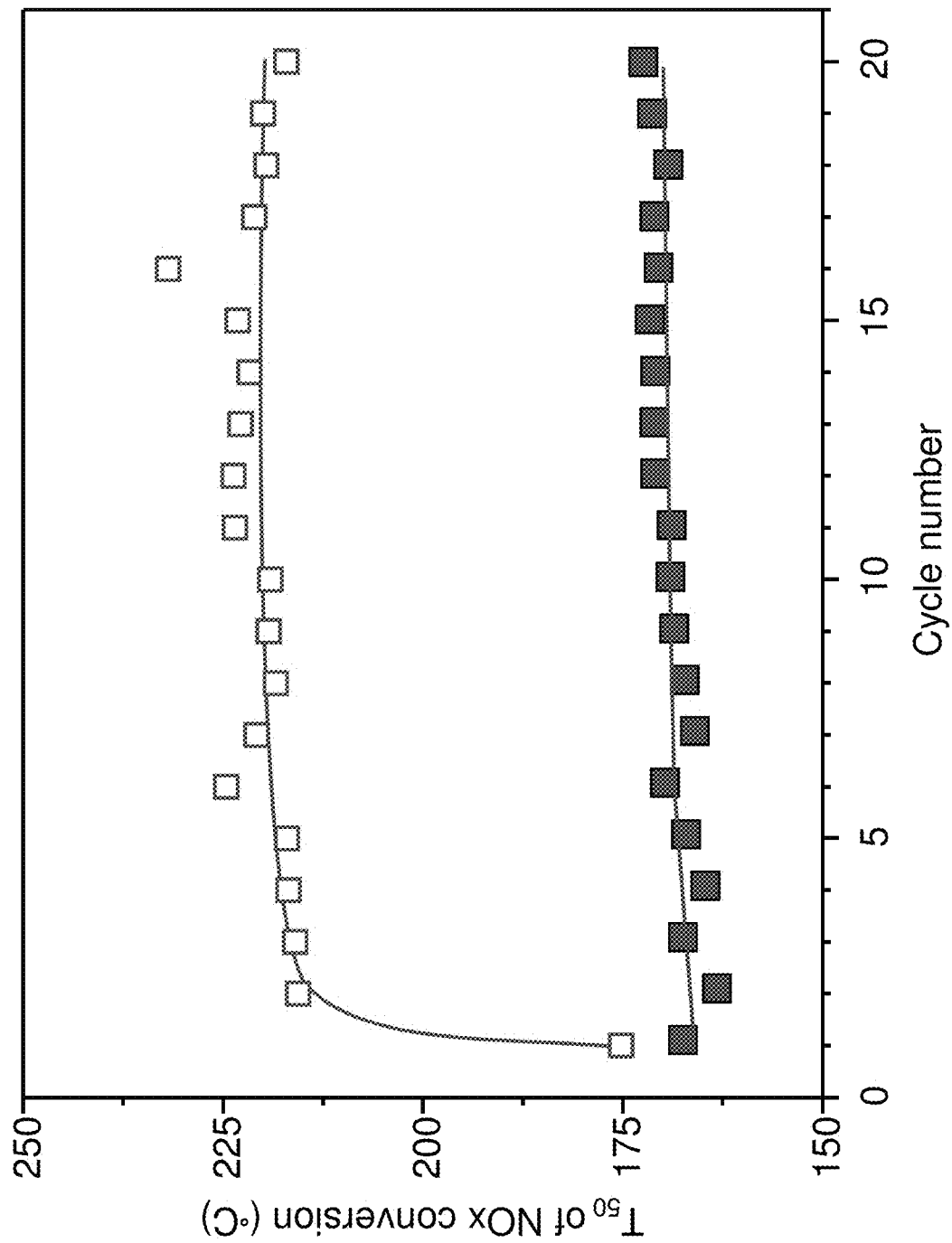
FIG. 7 shows a comparison between a binary nanoparticle and a ternary nanoparticle in reduction reaction of nitrogen oxide. Mostly constant $T_{50}$ is maintained although a slight change is observed in the initial stage. □: $Pd_{0.5}Ru_{0.5}$ binary nanoparticle (the activity deteriorates in the second or later time). ■: $Pd_{1/3}Ru_{1/3}Rh_{1/3}$ (the activity is maintained in the second or later time).

FIG. 7 is a graph showing $T_{50}$ (° C.) in reduction reaction of nitrogen oxide ($NO_x$) read from the graph showing $NO_x$ reduction catalytic activity of a noble metal-supported catalyst prepared with $Pd_{0.3}Ru_{0.3}Rh_{0.3}$ fine particles in FIG. 6. The vertical axis $T_{50}$ (° C.) of the graph indicates the temperature at which 50% conversion rate is achieved. For reference, a catalyst prepared with $Pd_{0.5}Ru_{0.5}$ fine particles was prepared in the same manner as described above, and $T_{50}$ of the catalyst was examined. In the graph, a significant deterioration in activity (increase in $T_{50}$) was observed in the second time in the binary $Pd_{0.5}Ru_{0.5}$ catalyst, revealing the significant improvement in catalytic characteristics by addition of Rh.

Figure 8:
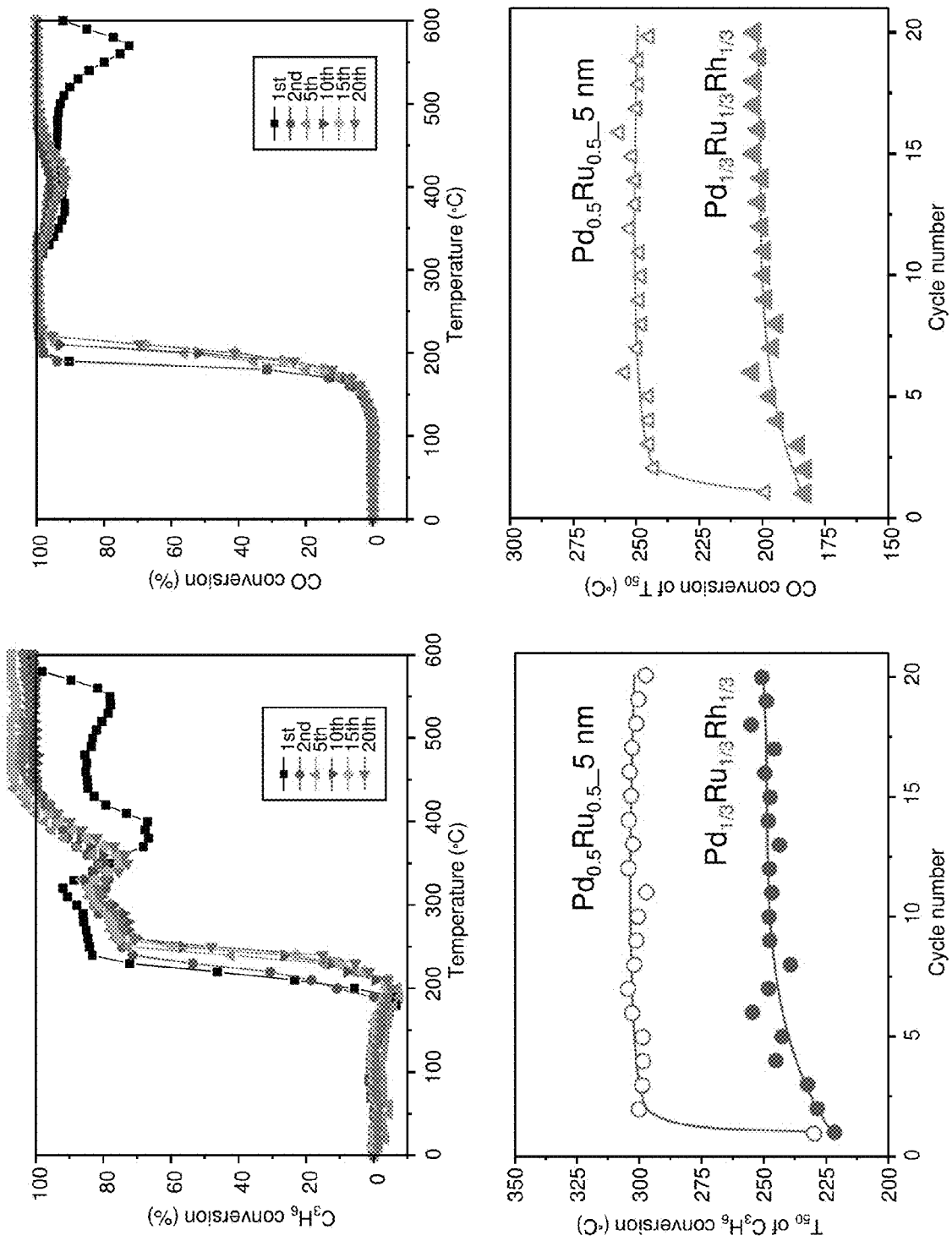
FIG. 8 shows evaluation of repetition durability of $Pd_{1/3}Ru_{1/3}Rh_{1/3}$ in oxidation reaction of carbon monoxide and hydrocarbon.

The upper graphs in FIG. 8 show the catalytic activities in CO oxidation reaction and CH oxidation reaction of a noble metal-supported catalyst prepared with $Pd_{1/3}Ru_{1/3}Rh_{1/3}$ fine particles. The vertical axis indicates a percentage of converted CO or CH. Similar behaviors were observed in measurements from the first time to the twentieth time, revealing that the catalytic activity did not deteriorate as in the $NO_x$ reduction reaction. The lower graphs show $T_{50}$ (° C.) in CO and CH oxidation reactions read out from the upper graphs. The vertical axis $T_{50}$ (° C.) of the graph indicates the temperature at which 50% conversion rate is achieved. For reference, a catalyst prepared with $Pd_{0.5}Ru_{0.5}$ fine particles obtained in Comparative Example 1 was prepared in the same manner as described above, and $T_{50}$ of the catalyst was examined. In the graph, a significant deterioration in activity (increase in $T_{50}$) was observed in the second time in the binary PdRu catalyst, revealing the significant improvement in catalytic characteristics by addition of Rh.

Figure 9:
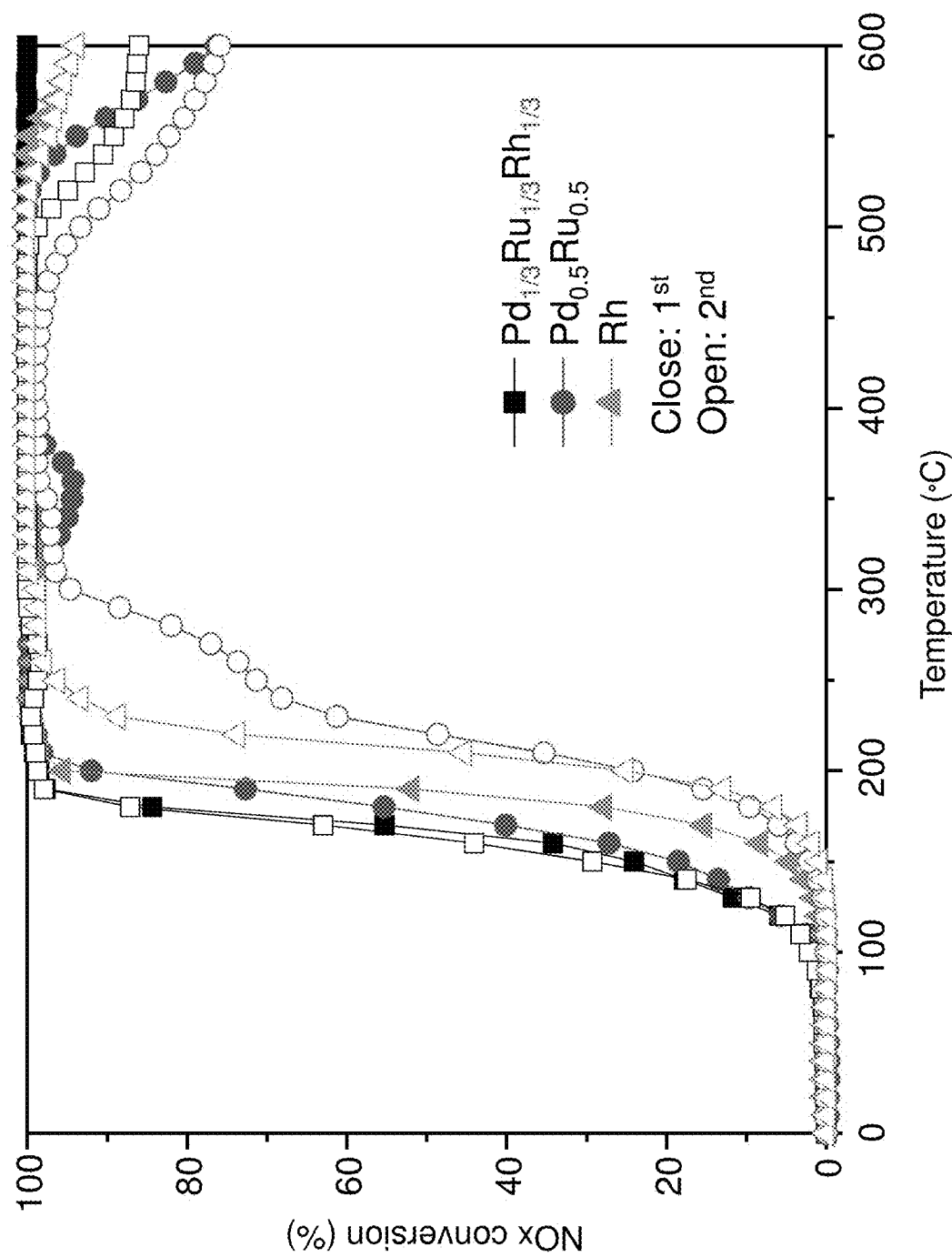
FIG. 9 shows a comparison of catalytic properties between a binary nanoparticle and a Rh nanoparticle in reduction reaction of nitrogen oxide in $Pd_{1/3}Ru_{1/3}Rh_{1/3}$. Although even Rh shows deterioration in activity between the first time and the second time, the $Pd_{1/3}Ru_{1/3}Rh_{1/3}$ has remarkably stabilized properties, exhibits composite effect, and is very useful for an exhaust gas purification catalyst.

FIG. 9 are graphs showing $NO_x$ reduction catalytic activity of noble metal-supported catalysts prepared with $Pd_{1/3}Ru_{1/3}Rh_{1/3}$ fine particles, $Pd_{0.5}Ru_{0.5}$ fine particles, or Rh fine particles. The vertical axis indicates a percentage of converted nitrogen oxide. The measurement results of the first time and the second time are shown. In the second time, deterioration in activity was observed in $Pd_{0.5}Ru_{0.5}$ and Rh, but a similar behavior as in the first time was observed in $Pd_{1/3}Ru_{1/3}Rh_{1/3}$, revealing that the catalytic activity did not deteriorate.

Example 3: Production of Ternary Solid Solution Fine Particles (Pd:Ru:Cu=1:1:1)

Figure 10:
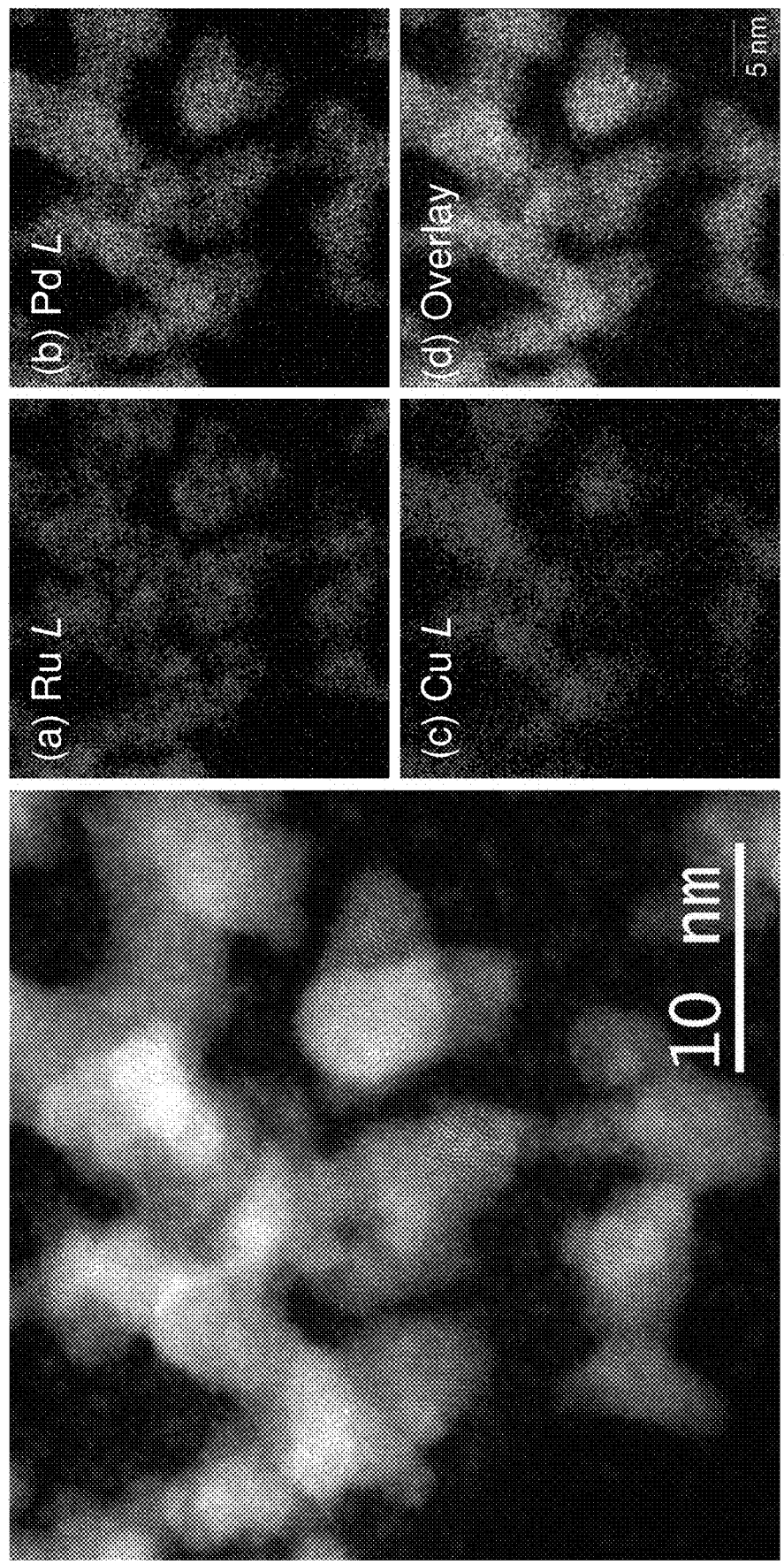
FIG. 10 shows an HAADF-STEM image and STEM-EDX images of a PdRuCu nanoparticle. A solid solution in which each of elements Ru, Pd, and Cu was uniformly distributed in each particle was formed.
Figure 11:
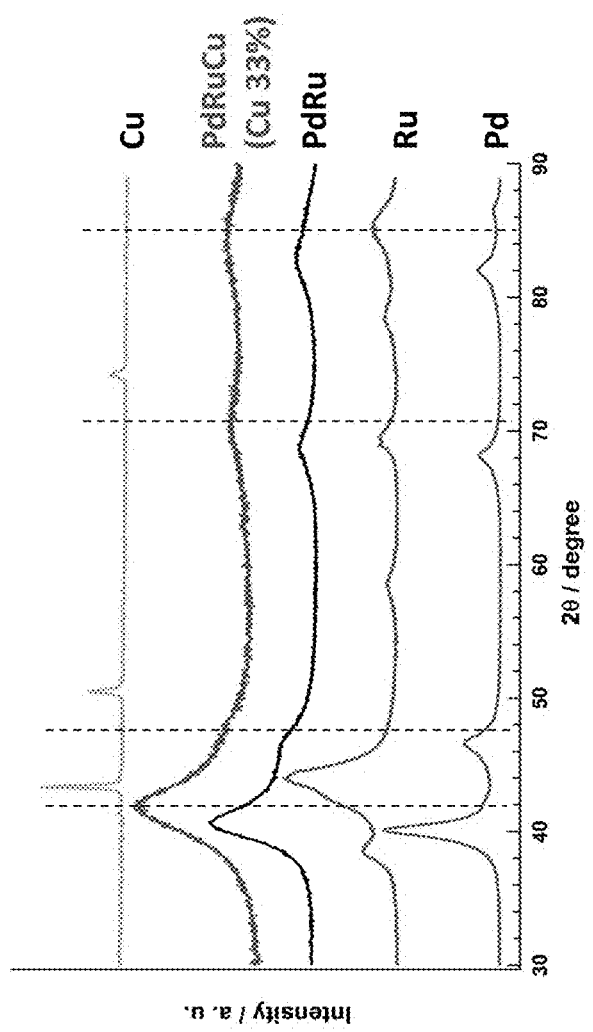
FIG. 11 shows an XRD pattern of a PdRuCu nanoparticle. The peak of PdRuCu does not coincide with the peaks of any of Pd, Ru, and Cu, and the pattern is a single fcc pattern. This revealed that the PdRuCu solid solution was successfully synthesized.
Figure 12:
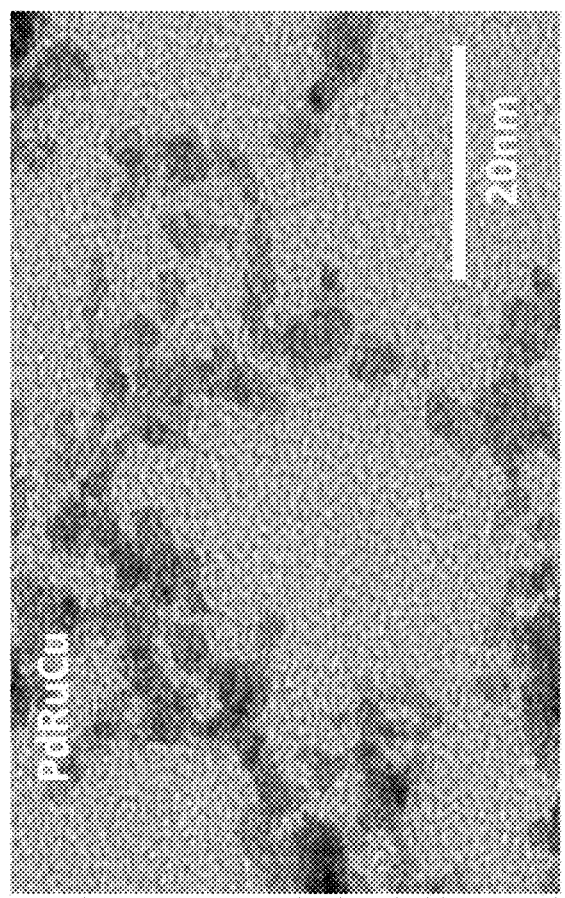
FIG. 12 shows a TEM image of a ternary solid solution nanoparticle ($Pd_{1/3}Ru_{1/3}Cu_{1/3}$). The nanoparticle had a mean particle size of 2 to 4 nm.

To a mixture of 300 ml of triethylene glycol, PVP (2 mmol), and NaOH (10 mmol) heated at 225° C. under stirring, a solution of $K_2PdCl_4$ (0.2 mmol), $RuCl_3$ (0.2 mmol), and $CuSO_4.5H_2O$ (0.2 mmol) in 40 ml of ion exchange water was sprayed while the temperature was kept at 220° C., and the resultant solution was then kept at 220° C. for 10 minutes and allowed to cool. The generated precipitates were then separated by centrifugation. For the separated $Pd_{1/3}Ru_{1/3}Cu_{1/3}$ ternary solid solution fine particles in a solid solution state, STEM-EDX images and an HAADF-STEM image (FIG. 10), an XRD pattern (FIG. 11) and a TEM image (FIG. 12) were measured. The ternary solid solution fine particle had a mean particle size of 2 to 4 nm.

Example 4: Production of Ternary Solid Solution Fine Particles (Pd:Ru:Ir=1:1:1)

Figure 13:
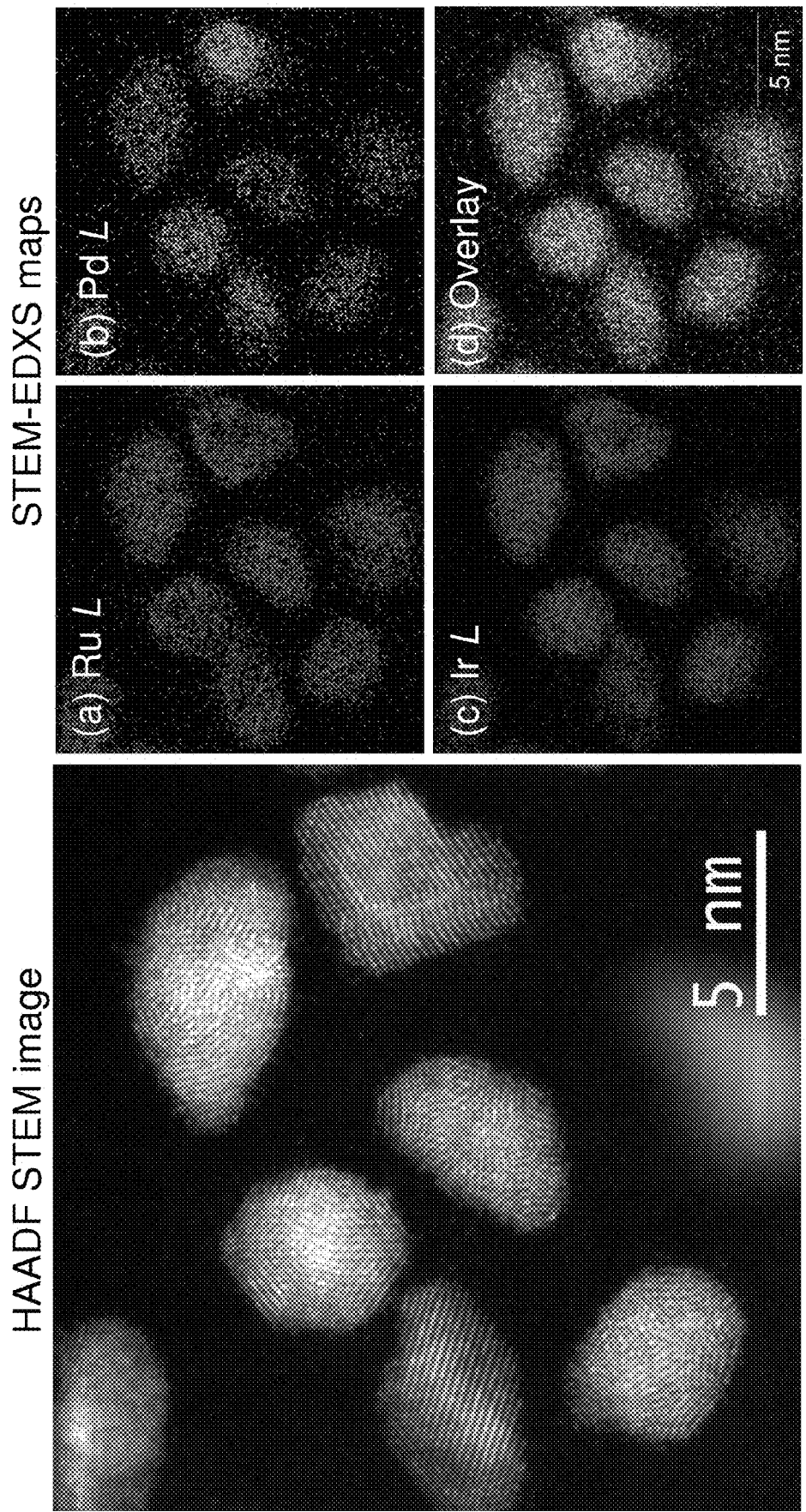
FIG. 13 shows an HAADF-STEM image and STEM-EDX images of a PdRu—Ir nanoparticle. Each of elements Ru, Pd, and Ir was uniformly distributed in each particle, and a solid solution was formed.

$Pd_{1/3}Ru_{1/3}Ir_{1/3}$ ternary solid solution fine particles were produced in the same manner as in Example 3 except that $IrCl_4$ (0.2 mmol) was used in place of $CuSO_4.5H_2O$ (0.2 mmol) in Example 3. For the obtained $Pd_{1/3}Ru_{1/3}Ir_{1/3}$ ternary solid solution fine particles, STEM-EDX images and an HAADF-STEM image (FIG. 13) were measured.

Example 5: Production of Ternary Solid Solution Fine Particles (Pd:Ru:Pt=1:1:1)

Figure 14:
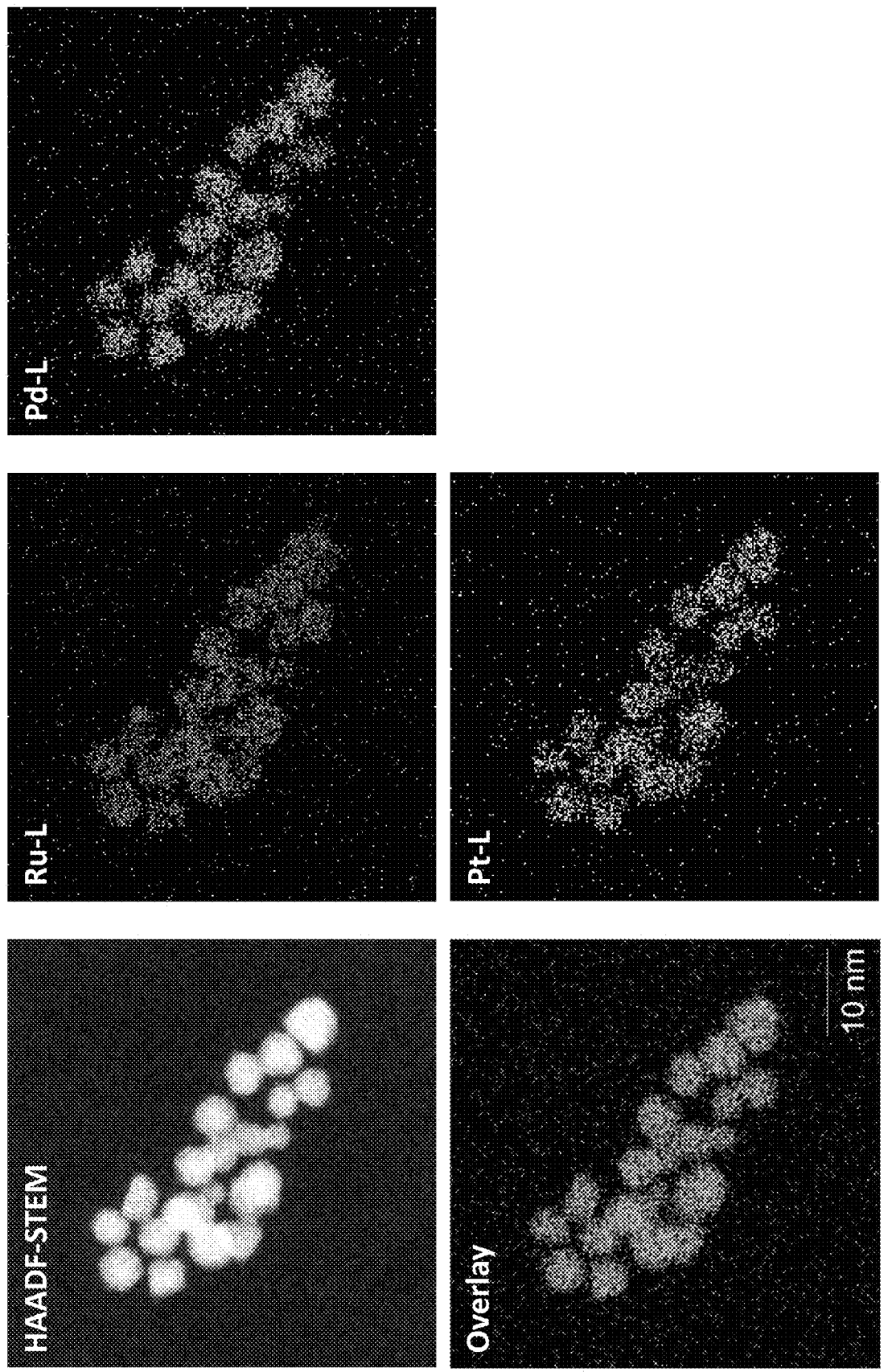
FIG. 14 shows an HAADF-STEM image and STEM-EDX images of a PdRu—Pt nanoparticle. Each of elements Ru, Pd, and Pt was uniformly distributed in each particle, and a solid solution was formed.

$Pd_{1/3}Ru_{1/3}Pt_{1/3}$ ternary solid solution fine particles were produced in the same manner as in Example 3 except that $K_2PtCl_4$ (0.2 mmol) was used in place of $CuSO_4.5H_2O$ (0.2 mmol) in Example 3. For the obtained $Pd_{1/3}Ru_{1/3}Pt_{1/3}$ ternary solid solution fine particles, STEM-EDX images and an HAADF-STEM image (FIG. 14) were measured.

Test Example 2

Figure 15:
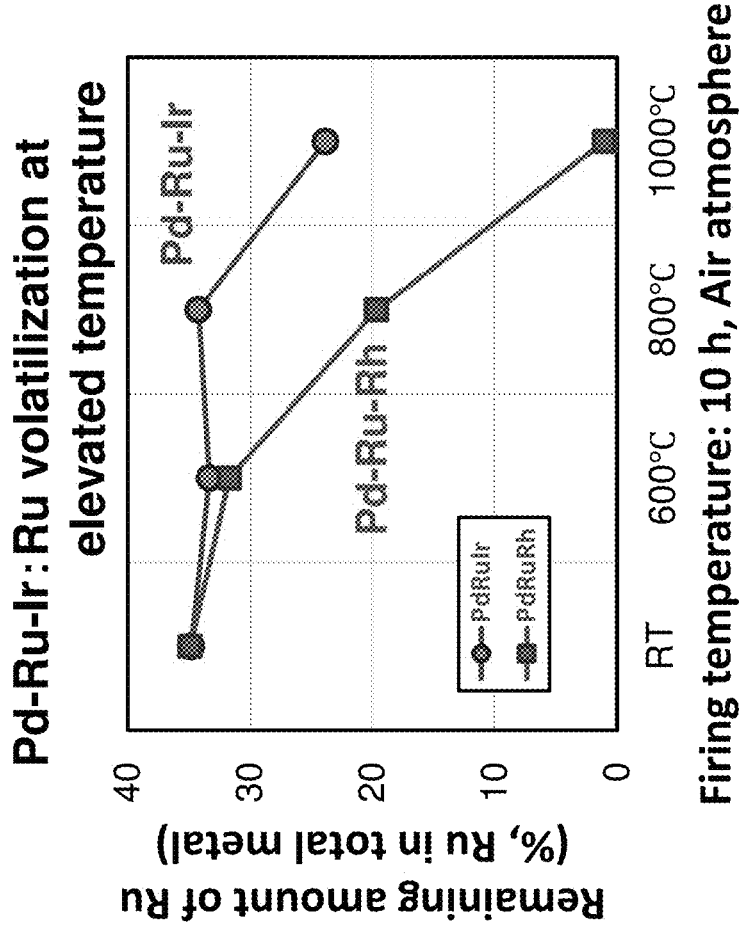
FIG. 15 shows change in physical property by addition of a third element: comparison of Ru volatilization in a high temperature oxidizing atmosphere between Pd—Ru—Rh and Pd—Ru—Ir. While Ru volatilized as $RuO_4$ in a high temperature oxidizing atmosphere, the durability of Ru when contained in the form of PdRuIr was improved to further higher temperatures compared with PdRuRh.

$Pd_{1/3}Ru_{1/3}Rh_{1/3}$ alloy fine particles obtained in Example 2, or $Pd_{1/3}Ru_{1/3}Rh_{1/3}$ solid solution fine particles obtained in Example 4 were fired for 10 hours in an air atmosphere at 600° C., 800° C. or 1000° C., and a remaining amount of Ru was measured. The result is shown in FIG. 15. While Ru volatilizes as $RuO_4$ in a high temperature oxidizing atmosphere, the durability of Ru when contained in the form of PdRuIr was improved to further higher temperatures compared with PdRuRh.

Example 6

Figure 17:
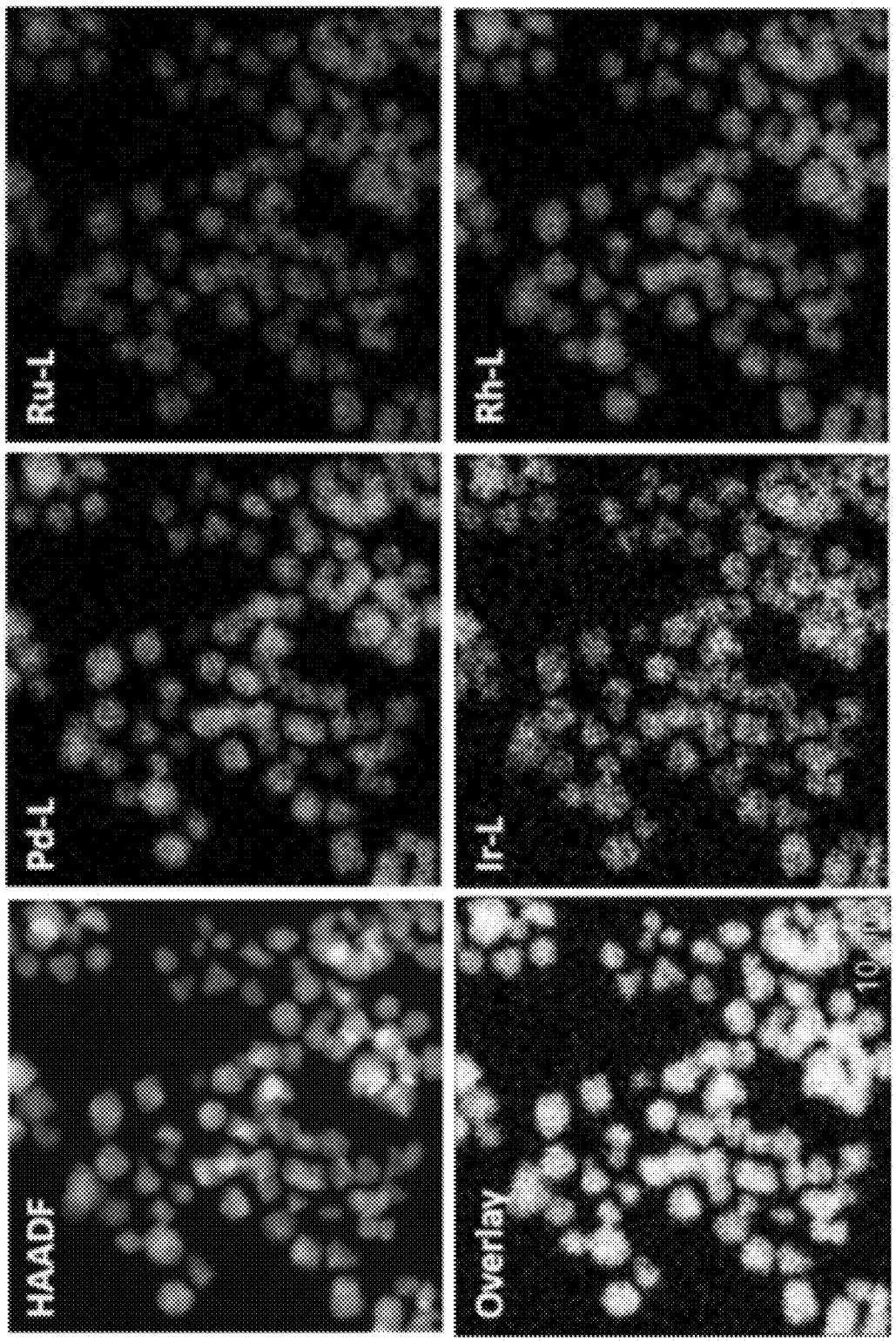
FIG. 17 shows an HAADF-STEM image and STEM-EDX images of a PdRuIrRh quaternary solid solution nanoparticle. Each of elements Pd, Ru, Ir and Rh was uniformly distributed in each particle, and a solid solution was formed. Overall composition quantified with each L line was Pd:Ru:Ir:Rh=0.23:0.21:0.31:0.25 (error approximately ±0.03).

To a mixture of 300 ml of triethylene glycol and PVP (10 mmol) heated at 225° C. under stirring, a solution of $K_2PdCl_4$ (0.25 mmol), $RuCl_3$ (0.25 mmol), $IrCl_4$ (0.25 mmol), and $RhCl_3$ (0.25 mmol) in 40 ml of ion exchange water was sprayed while the temperature was kept at 225° C., and the resultant solution was then kept at 225° C. for 10 minutes and allowed to cool. The generated precipitates were then separated by centrifugation. For the separated PdRuIrRh quaternary solid solution fine particles in the solid solution state, an XRD pattern (FIG. 16a), a TEM image (FIG. 16b), a linear analysis (FIG. 16c), and an HAADF-STEM image and STEM-EDX images (FIG. 17) were measured.

Example 7

Figure 18:
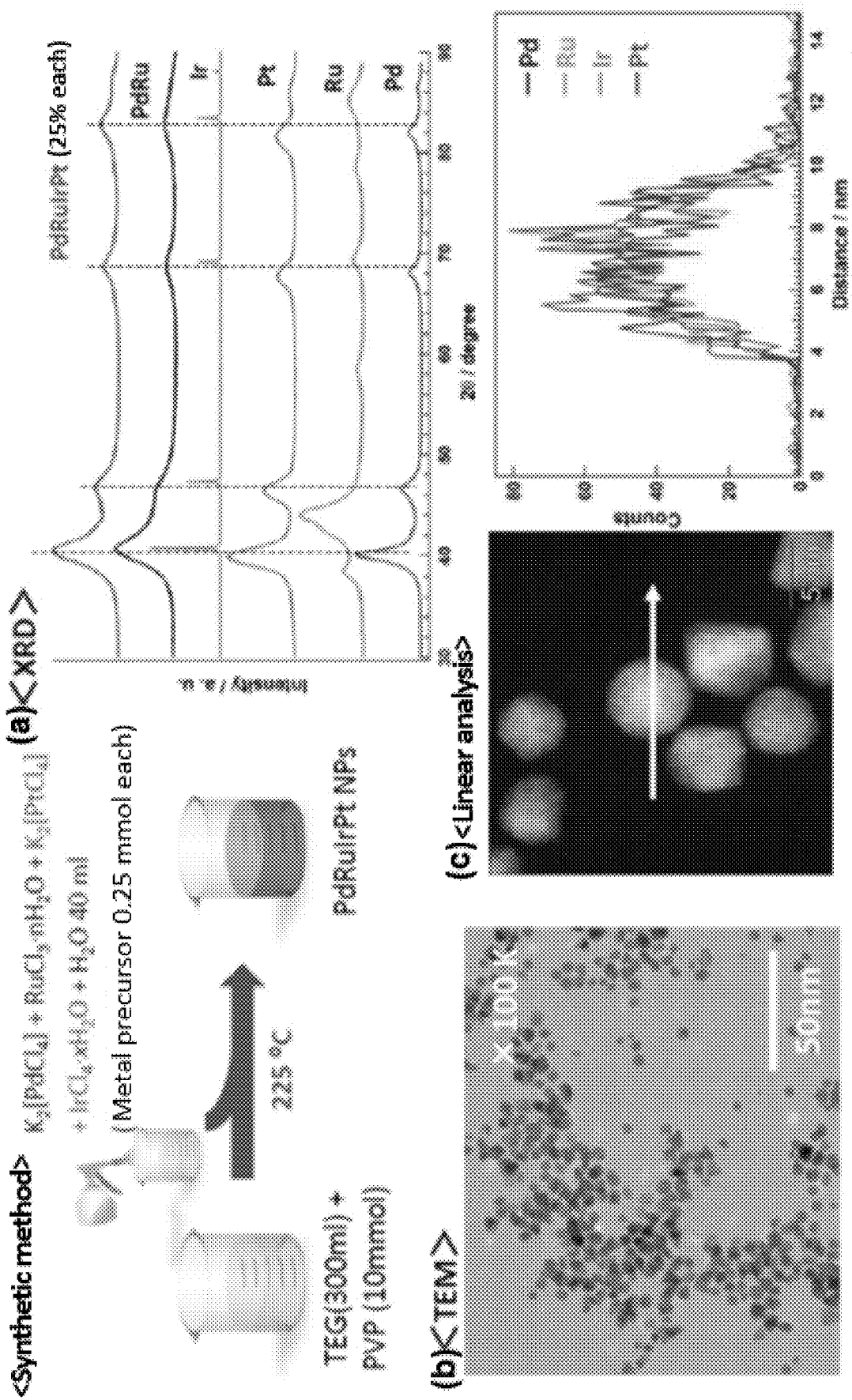
FIG. 18 shows (a) an XRD pattern, (b) a TEM image (mean particle size 4.1±1.1 nm) and (c) an STEM-EDX linear analysis of a PdRuIrPt quaternary solid solution nanoparticle. The PdRuIrPt solid solution was successfully synthesized.
Figure 19:
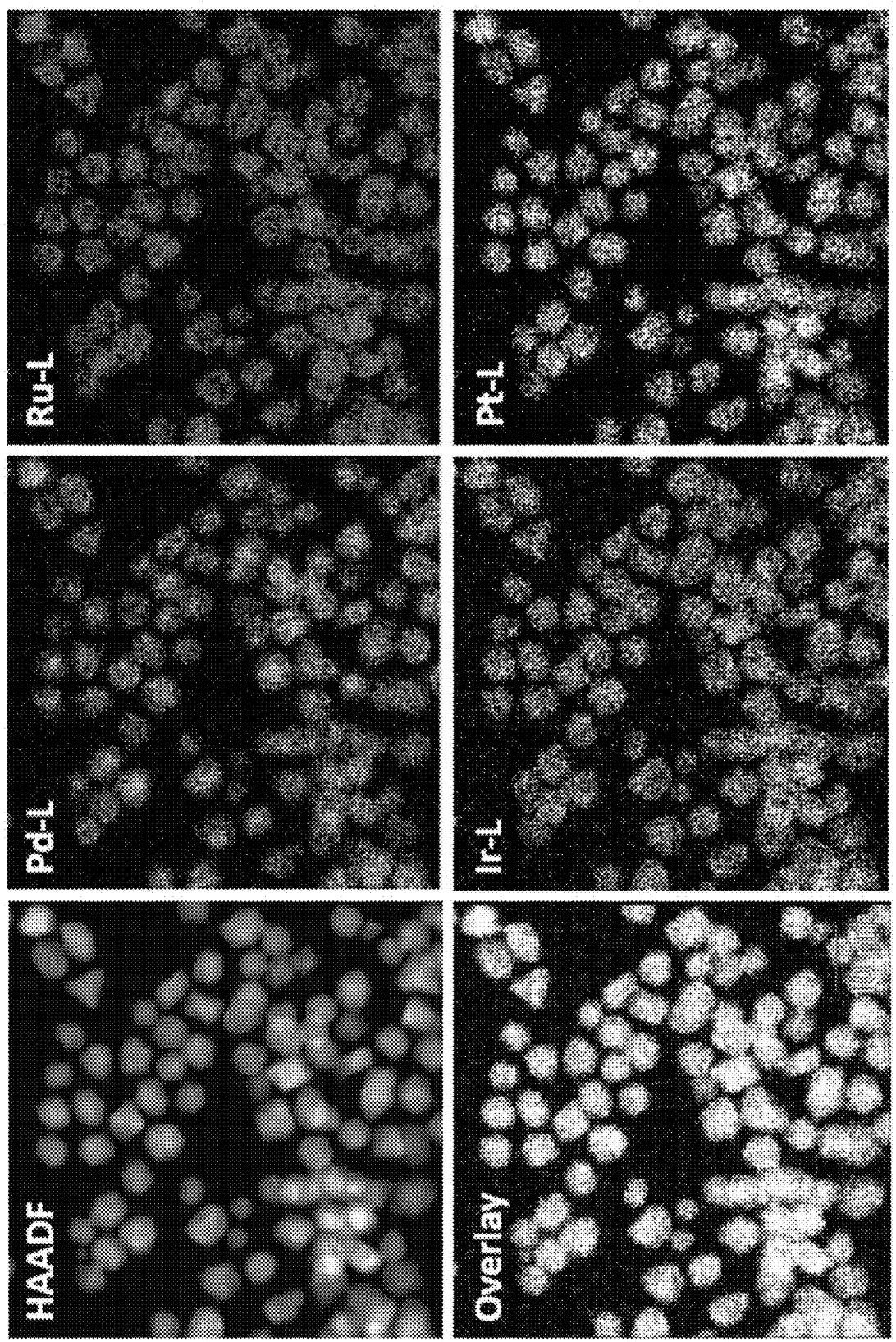
FIG. 19 shows an HAADF-STEM image and STEM-EDX images of a PdRuIrPt nanoparticle. Each of elements Pd, Ru, Ir and Pt was uniformly distributed in each particle, and a solid solution was formed. Overall composition quantified with each L line was Pd:Ru:Ir:Pt=0.25:0.30:0.24:0.21 (error approximately ±0.005).

To a mixture of 300 ml of triethylene glycol and PVP (10 mmol) heated at 225° C. under stirring, a solution of $K_2PdCl_4$ (0.25 mmol), $RuCl_3$ (0.25 mmol), $K_2PtCl_4$ (0.25 mmol), and $IrCl_4$ (0.25 mmol) in 40 ml of ion exchange water was sprayed while the temperature was kept at 225° C., and the resultant solution was then kept at 225° C. for 10 minutes and allowed to cool. The generated precipitates were then separated by centrifugation. For the separated PdRuIrPt quaternary solid solution fine particles in the solid solution state, an XRD pattern (FIG. 18a), a TEM image (FIG. 18b), a linear analysis (FIG. 18c), and an HAADF-STEM image and STEM-EDX images (FIG. 19) were measured.

Example 8

Figure 20:
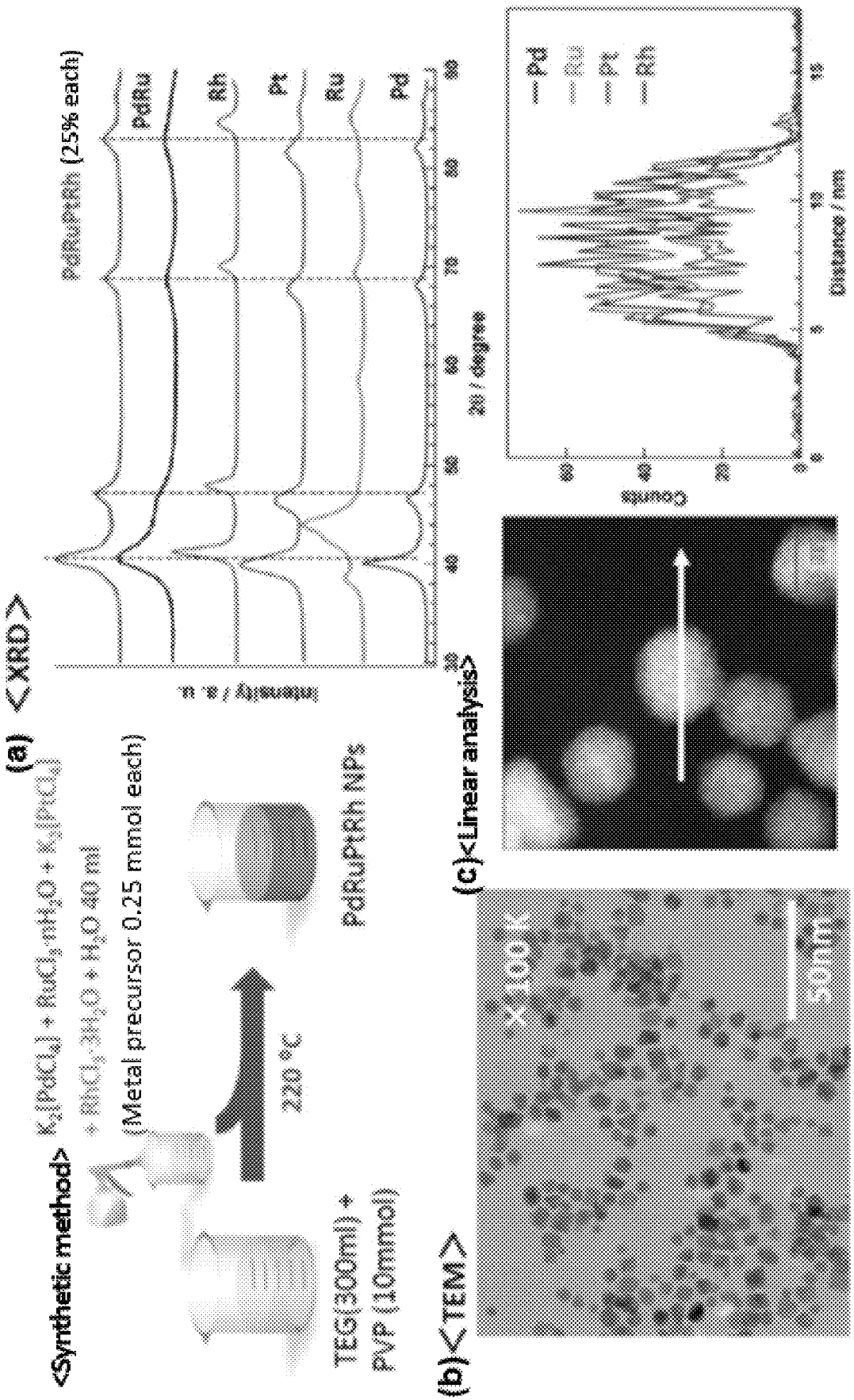
FIG. 20 shows (a) an XRD pattern, (b) a TEM image (mean particle size 5.7±1.3 nm) and (c) an STEM-EDX linear analysis of a PdRuPtRh quaternary solid solution nanoparticle. The PdRuPtRh solid solution was successfully synthesized.
Figure 21:
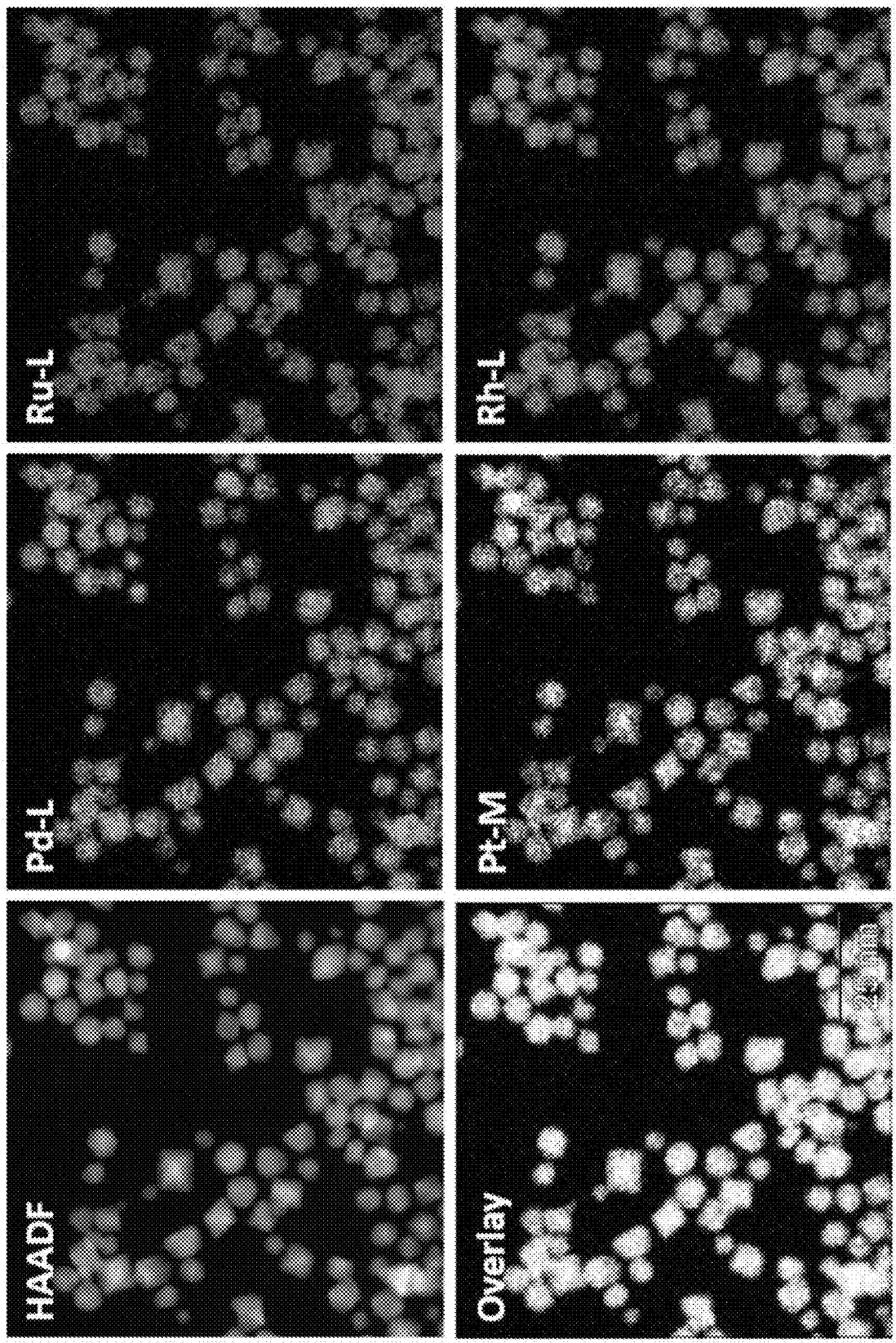
FIG. 21 shows an HAADF-STEM image and STEM-EDX images of a PdRuPtRh quaternary solid solution nanoparticle. Each of elements Pd, Ru, Pt and Rh was uniformly distributed in each particle, and a solid solution was formed. Overall composition quantified with M line for Pt, and L line for Pd, Ru, and Rh (Pd:Ru:Pt:Rh=0.21:0.21:0.31:0.27, error approximately ±0.02).

To a mixture of 300 ml of triethylene glycol and PVP (10 mmol) heated at 220° C. under stirring, a solution of $K_2PdCl_4$ (0.25 mmol), $RuCl_3$ (0.25 mmol), $K_2PtCl_4$ (0.25 mmol), and $RhCl_3$ (0.25 mmol) in 40 ml of ion exchange water was sprayed while the temperature was kept at 220° C., and the resultant solution was then kept at 220° C. for 10 minutes and allowed to cool. The generated precipitates were then separated by centrifugation. For the separated PdRuPtRh quaternary solid solution fine particles in the solid solution state, an XRD pattern (FIG. 20a), a TEM image (FIG. 20b), a linear analysis (FIG. 20c), and an HAADF-STEM image and STEM-EDX images (FIG. 21) were measured.

Example 9: Production of Ternary Solid Solution Fine Particles (Pd:Ru:Ag=1:1:1)

Figure 22:
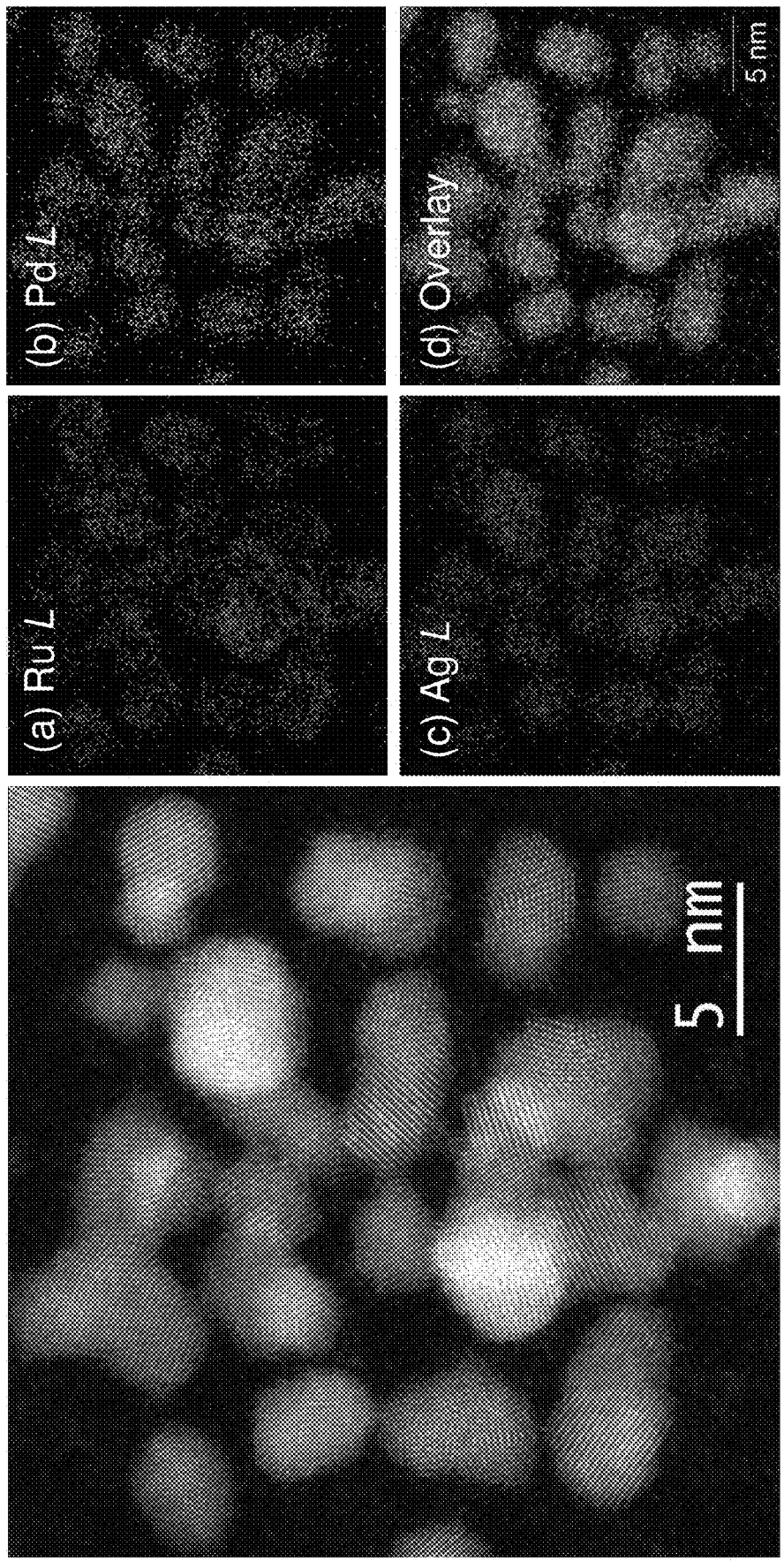
FIG. 22 shows an HAADF-STEM image and STEM-EDX images of a PdRuAg nanoparticle. A solid solution in which each of elements Ru, Pd, and Ag was uniformly distributed in each particle was formed.
Figure 23:
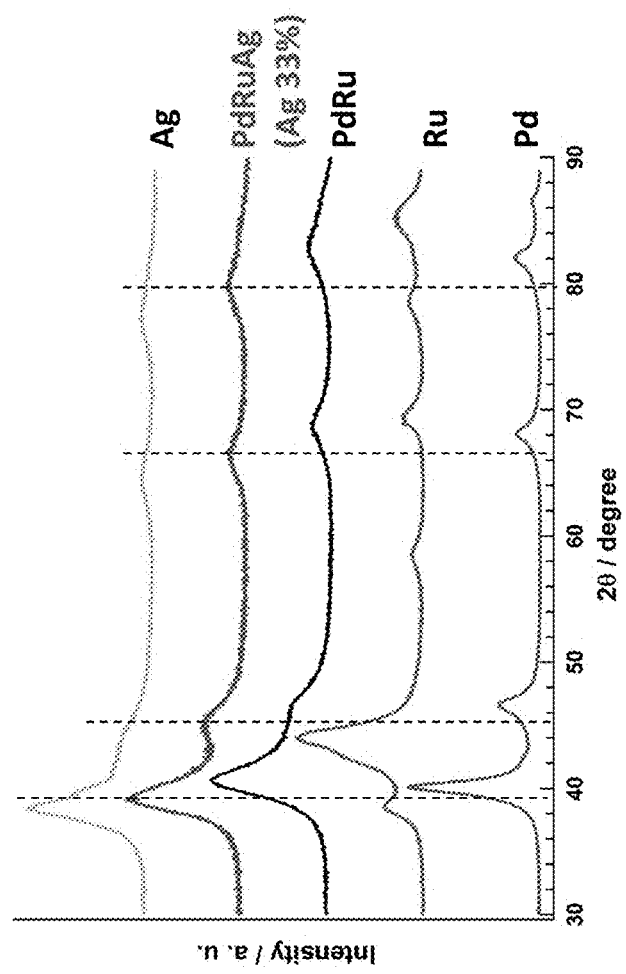
FIG. 23 shows an XRD pattern of a PdRuAg nanoparticle. The peak of PdRuAg does not coincide with the peaks of any of Pd, Ru, and Ag, and the pattern is a single fcc pattern. This revealed that the PdRuAg solid solution was successfully synthesized.
Figure 24:
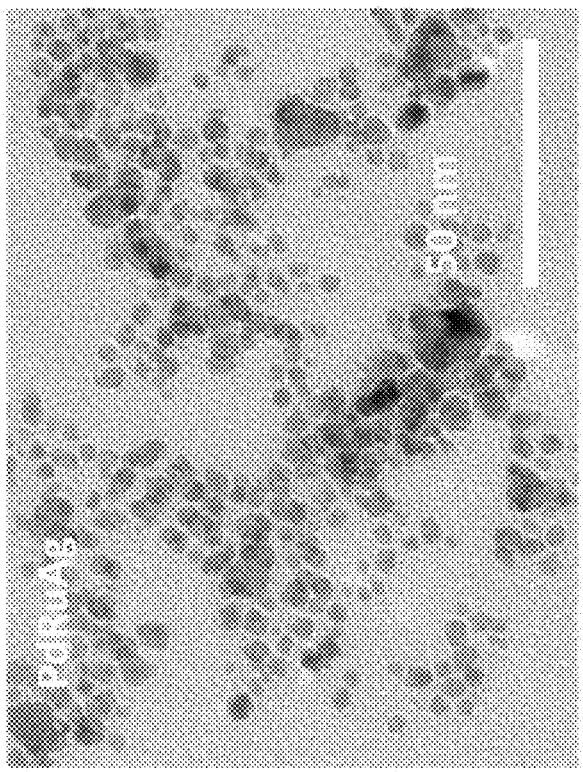
FIG. 24 shows a TEM image of a ternary solid solution nanoparticle (Pd$_{1/3}$Ru$_{1/3}$Ag$_{1/3}$). The nanoparticle had a mean particle size of 3.6±1.0 nm.

To a mixture of 100 ml of triethylene glycol and PVP (0.6 mmol) heated at 210° C. under stirring, a solution of $PdNO_3$ (0.2 mmol), $Ru(COOCH_3)_3$ (0.2 mmol) and $AgNO_3$ (0.2 mmol) in 10 ml of ion exchange water was dropped at 1.0 ml/min with a syringe pump while the temperature was kept at 210° C., and the resultant solution was then kept at 210° C. for 10 minutes and allowed to cool. The generated precipitates were then separated by centrifugation. For the separated $Pd_{1/3}Ru_{1/3}Ag_{1/3}$ ternary solid solution fine particles in a solid solution state, STEM-EDX images and an HAADF-STEM image (FIG. 22), an XRD pattern (FIG. 23), and a TEM image (FIG. 24) were measured. The ternary solid solution fine particle had a mean particle size of 3.6±1.0 nm.

Example 10: Production of Ternary Solid Solution Fine Particles (Pd:Ru:Au=1:1:1)

Figure 25:
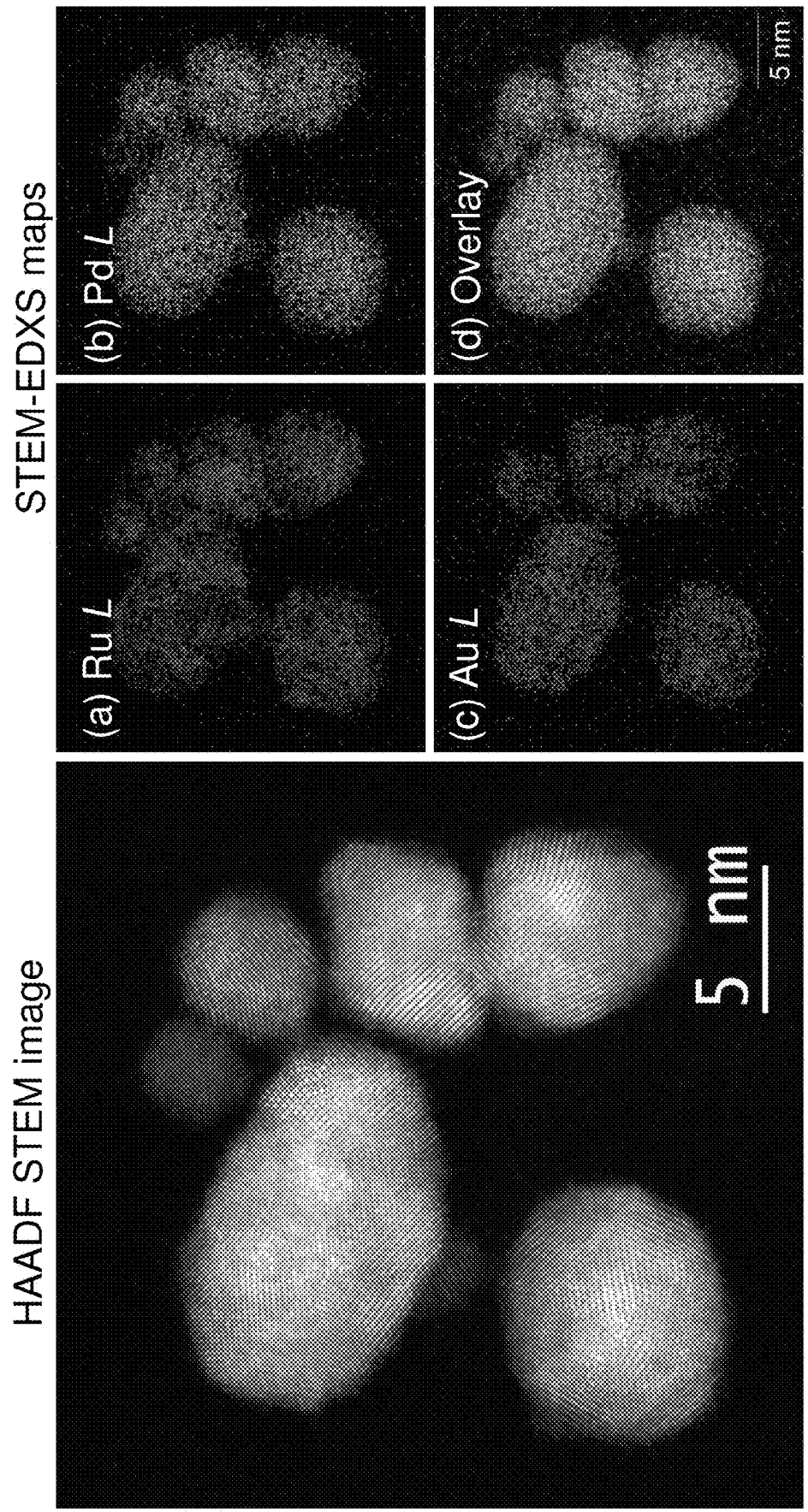
FIG. 25 shows an HAADF-STEM image and STEM-EDX images of a PdRuAu nanoparticle. A solid solution in which each of elements Ru, Pd, and Au was uniformly distributed in each particle was formed.
Figure 26:
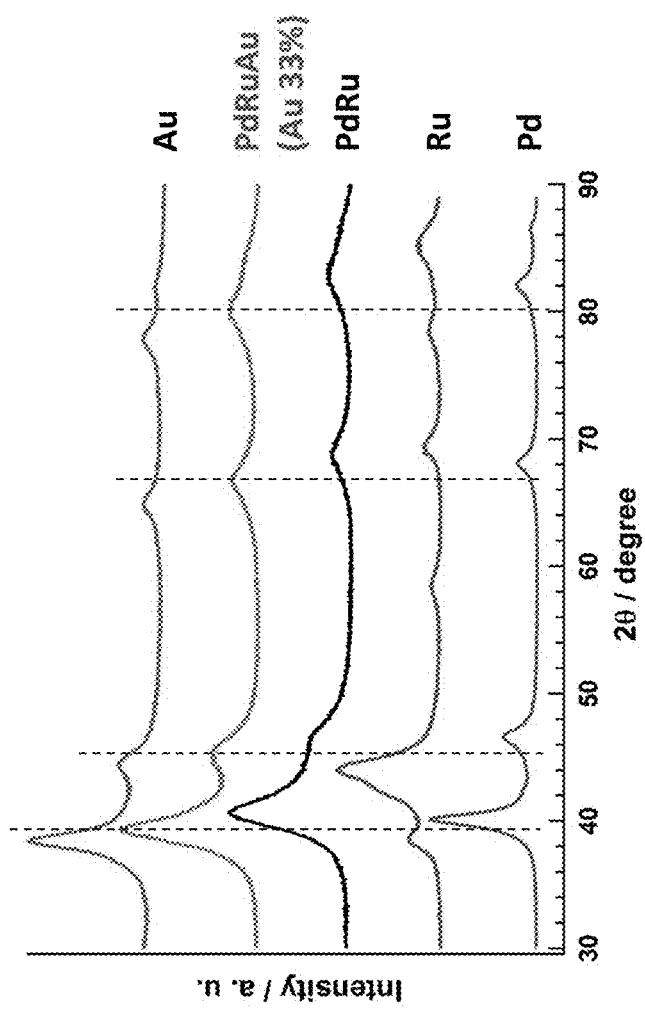
FIG. 26 shows an XRD pattern of a PdRuAu nanoparticle. The peak of PdRuAu does not coincide with the peaks of any of Pd, Ru, and Au, and the pattern is a single fcc pattern. This revealed that the PdRuAu solid solution was successfully synthesized.
Figure 27:
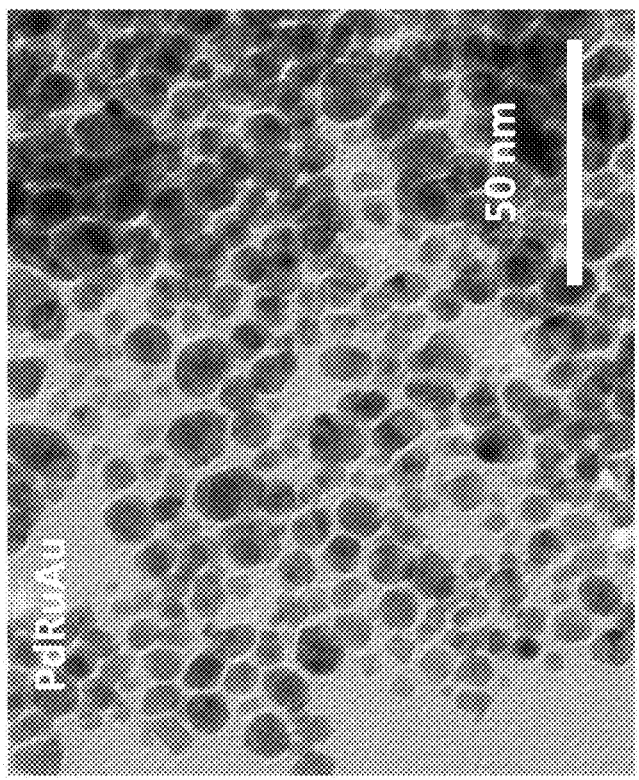
FIG. 27 shows a TEM image of a ternary solid solution nanoparticle (Pd$_{1/3}$Ru$_{1/3}$Au$_{1/3}$). The nanoparticle had a mean particle size of 5.8±1.9 nm.

To a mixture of 150 ml of triethylene glycol and PVP (1 mmol) heated at 225° C. under stirring, a solution of K$_2$PdCl$_4$ (0.1 mmol), RuCl$_3$ (0.1 mmol), and HAuCl$_4$ (0.1 mmol) in 20 ml of ion exchange water was sprayed while the temperature was kept at 225° C., and the resultant solution was then kept at 225° C. for 10 minutes and allowed to cool. The generated precipitates were then separated by centrifugation. For the separated Pd$_{1/3}$Ru$_{1/3}$Au$_{1/3}$ ternary solid solution fine particles in a solid solution state, STEM-EDX images and an HAADF-STEM image (FIG. 25), an XRD pattern (FIG. 26), and a TEM image (FIG. 27) were measured. The ternary solid solution fine particle had a mean particle size of 5.8±1.9 nm.

INDUSTRIAL APPLICABILITY

The multinary solid solution fine particle or a catalyst comprising the alloy fine particle cluster according to the present invention is useful as a catalyst for automobile exhaust-gas purification, an electrode catalyst for domestic fuel cells, etc.

The invention claimed is:

1. A multinary solid solution fine particle represented by Pd$_x$Ru$_y$M$_z$, wherein M is at least one member selected from the group consisting of Rh, Pt, Cu, and Ir, and wherein x+y+z=1, x+y=0.01 to 0.99, z=0.99 to 0.01, and x:y=0.1:0.9 to 0.9:0.1.

2. The multinary solid solution fine particle according to claim 1, wherein M is one or two members selected from the group consisting of Rh, Pt, Cu, and Ir.

3. The multinary solid solution fine particle according to claim 1, wherein M is represented by M$^1_p$M$^2_q$, wherein M$^1$ and M$^2$ are different from each other and each is selected from the group consisting of Rh, Pt, Cu, and Ir, and wherein p=0.01 to 0.99, q=0.99 to 0.01, and p+q=1.

4. The multinary solid solution fine particle according to claim 1, wherein M$^1$ and M$^2$ are any one of a combination of Ir and Rh, a combination of Ir and Pt, or a combination of Rh and Pt.

5. The multinary solid solution fine particle according to claim 1, wherein M is Rh.

6. The multinary solid solution fine particle according to claim 1, wherein x+y=0.05 to 0.95, z=0.95 to 0.05, and x:y=0.15:0.85 to 0.85:0.15.

7. The multinary solid solution fine particle according to claim 1, wherein x+y=0.1 to 0.9, z=0.9 to 0.1, and x:y=0.2:0.8 to 0.8:0.2.

8. A catalyst comprising the multinary solid solution fine particle according to claim 1.

9. A supported catalyst comprising the catalyst according to claim 8, and a carrier, the catalyst being supported on the carrier.

10. The supported catalyst according to claim 9, wherein the carrier is a carrier including an oxide.

11. The supported catalyst according to claim 9, the supported catalyst being a catalyst for purification of exhaust gas.

12. A method for producing the multinary solid solution fine particle according to claim 1, the method comprising adding an aqueous solution containing: at least one member selected from the group consisting of an Rh compound, a Pt compound, a Cu compound, and an Ir compound; a Pd compound; and a Ru compound to a liquid reducing agent heated to 150° C. to 250° C. to cause reaction thereamong.

13. A method for producing the supported catalyst according to claim 9, the method comprising adding an aqueous solution containing: at least one member selected from the group consisting of an Rh compound, a Pt compound, a Cu compound, and an Ir compound; a Pd compound; and a Ru compound, and a carrier to a liquid reducing agent heated to 150° C. to 250° C. to cause reaction thereamong.

14. The method according to claim 13, wherein the carrier is a carrier including an oxide.

15. The multinary solid solution fine particle according to claim 1, wherein M is Ir.

* * * * *